(12) United States Patent
Sukhadia et al.

(10) Patent No.: US 7,094,857 B2
(45) Date of Patent: Aug. 22, 2006

(54) ETHYLENE POLYMERS AND COPOLYMERS WITH HIGH OPTICAL OPACITY

(75) Inventors: Ashish M. Sukhadia, Bartlesville, OK (US); Jerry D. Stark, Bartlesville, OK (US); Max P. McDaniel, Bartlesville, OK (US); Elizabeth A. Benham, Spring, TX (US); Michael D. Jensen, Bartlesville, OK (US); Joel L. Martin, Bartlesville, OK (US); Rajendra K. Krishnaswamy, Bartlesville, OK (US)

(73) Assignee: Chevron Phillips Chemical Company, L.P., The Woodlands, TX (US)

( * ) Notice: Subject to any disclaimer, the term of this patent is extended or adjusted under 35 U.S.C. 154(b) by 38 days.

(21) Appl. No.: 10/797,897

(22) Filed: Mar. 10, 2004

(65) Prior Publication Data
US 2005/0203265 A1   Sep. 15, 2005

(51) Int. Cl.
C08F 110/02   (2006.01)
(52) U.S. Cl. ............... 526/352; 526/348.5; 526/348.1; 526/348
(58) Field of Classification Search ............... 526/352, 526/348.5, 348.1, 348
See application file for complete search history.

(56) References Cited

U.S. PATENT DOCUMENTS

| | | | |
|---|---|---|---|
| 4,594,211 A | 6/1986 | Mohnhaupt | |
| 4,851,478 A | 7/1989 | Su | |
| 5,281,679 A | 1/1994 | Jejelowo et al. | |
| 5,359,015 A | 10/1994 | Jejelowo | |
| 5,370,940 A * | 12/1994 | Hazlitt et al. | 428/516 |
| 5,374,700 A | 12/1994 | Tsutsui et al. | |
| 5,585,418 A | 12/1996 | Nagata | |
| 5,798,427 A | 8/1998 | Foster et al. | |
| 6,107,230 A | 8/2000 | McDaniel et al. | |
| 6,143,854 A | 11/2000 | Bamburger et al. | |
| 6,159,617 A | 12/2000 | Foster et al. | |
| 6,165,929 A | 12/2000 | McDaniel et al. | |
| 6,239,059 B1 * | 5/2001 | Saudemont et al. | 502/120 |
| 6,255,426 B1 | 7/2001 | Lue et al. | |
| 6,300,271 B1 | 10/2001 | McDaniel et al. | |
| 6,376,415 B1 | 4/2002 | McDaniel et al. | |
| 6,613,852 B1 | 9/2003 | McDaniel et al. | |
| 6,833,338 B1 | 12/2004 | McDaniel et al. | |

FOREIGN PATENT DOCUMENTS

| | | |
|---|---|---|
| EP | 0927201 B1 | 7/1999 |
| WO | WO 04055061 A1 | 7/2004 |

OTHER PUBLICATIONS

Sukhadia et al, "Optical Haze Properties of Polyethylene Blown Films: Part 2—The Origins of Various Surface Roughness Mechanism", ANTEC 2001, 1931-1935.
Broyer et al, "Analysis of Molecular Weight Distribution Using Multicomponent Models", Computer Applications in Applied Polymer Science, pp. 45-64, [Amer. Chem. Society 1982].

* cited by examiner

Primary Examiner—Ling-Sui Choi
(74) Attorney, Agent, or Firm—Womble Carlyle Sandridge & Rice, PLLC

(57) ABSTRACT

This invention relates to the field of metal-catalyzed olefin polymerization methods and the polymers and films prepared therefrom. In one aspect, this invention provides polyethylene and ethylene/α-olefin copolymers formed in the presence of tightly-bridged metallocene catalyst, organoaluminum cocatalyst, and a chemically-treated solid oxide, and optionally in the presence of additional cocatalysts. The resins and films prepared from these polymers exhibit high haze values, low clarity values, and a low coefficient of friction.

42 Claims, 6 Drawing Sheets

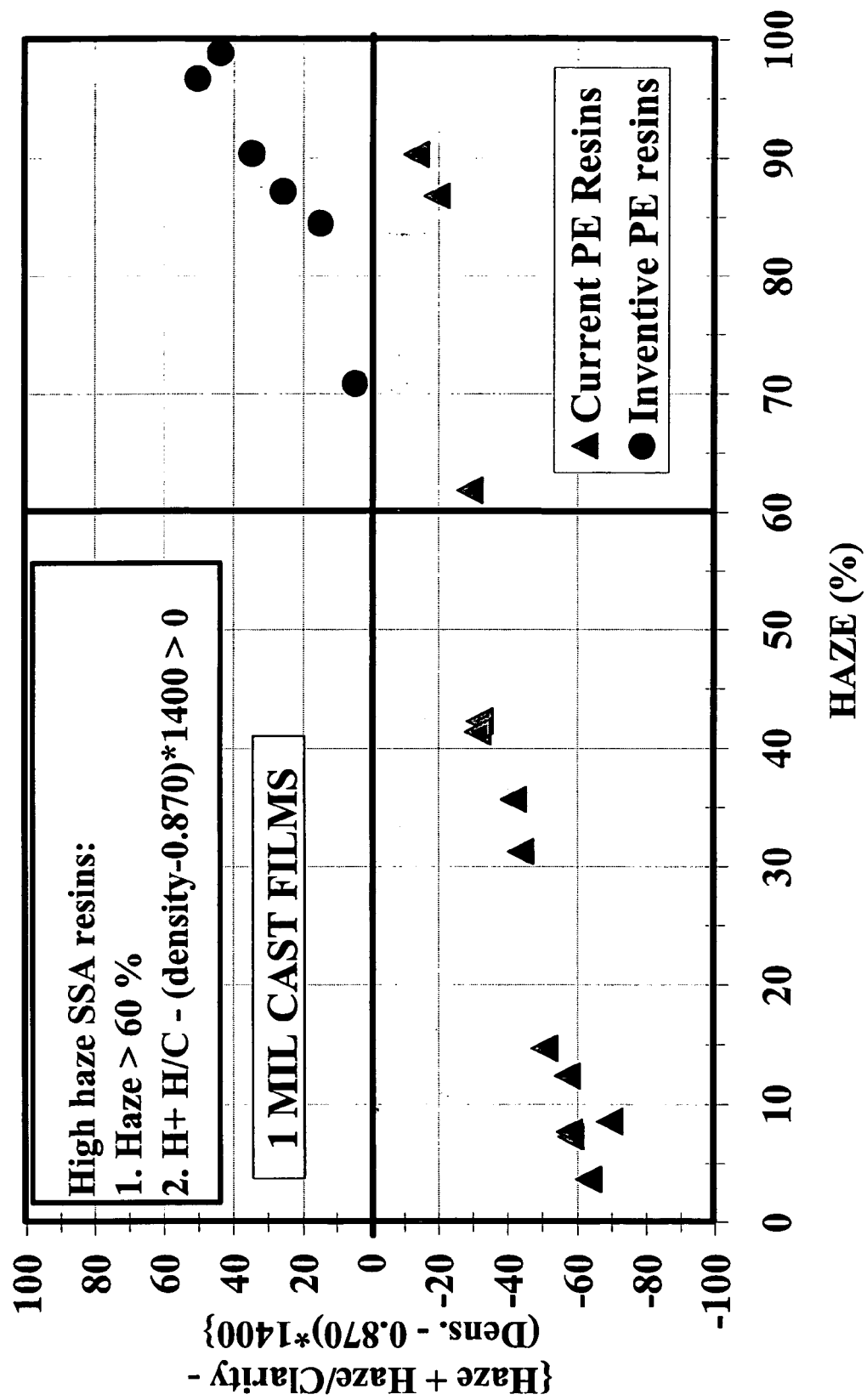

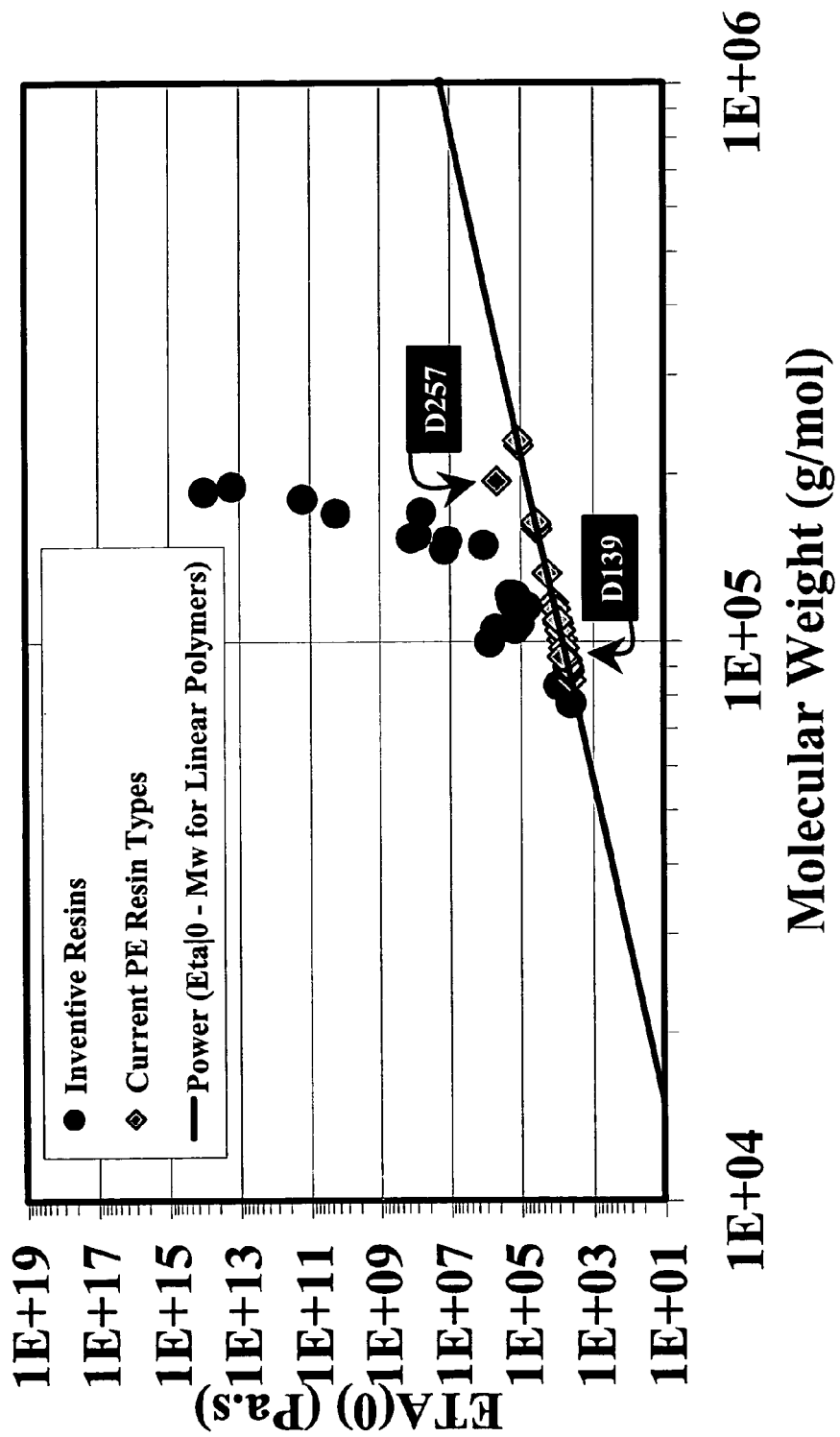

ETHYLENE POLYMERS AND COPOLYMERS WITH HIGH OPTICAL OPACITY

TECHNICAL FIELD OF THE INVENTION

This invention relates to the field of olefin polymers and copolymers, polymer films, and methods for the polymerizing olefins, particularly using supported catalyst compositions.

BACKGROUND OF THE INVENTION

It is known that mono-1-olefins (α-olefins), including ethylene, can be polymerized with catalyst compositions employing titanium, zirconium, vanadium, chromium or other metals, impregnated on a variety of support materials, often in the presence of cocatalysts. These catalyst compositions may be useful for both homopolymerization of ethylene, as well as copolymerization of ethylene with comonomers such as propylene, 1-butene, 1-hexene, or other higher α-olefins. Therefore, there exists a constant search to develop new olefin polymerization catalysts, catalyst activation processes, and methods of making and using catalysts that will provide enhanced catalytic activities and polymeric materials tailored to specific end uses.

Linear low-density polyethylene (LLDPE) films, made by blown film or cast film processes, are widely utilized for packaging applications. Most packaging applications require either high transparency (low haze and high clarity), or either no or low transparency (high haze and low clarity). While high transparency is often achieved through resin design, low transparency is typically achieved through the addition of coloring agents or fillers such as titanium oxide and the like.

What are needed are new resins that provide films of high opacity (low transparency), without the need for adding coloring agents or fillers in substantial amounts. What are also needed are catalyst compositions and methods that afford such resins and films.

SUMMARY OF THE INVENTION

In one aspect, the present invention provides ethylene polymers and copolymers that form films having a high haze or low clarity. This invention further provides, for example, catalyst compositions and methods for polymerizing olefins using the catalyst compositions disclosed herein.

In another aspect, this invention provides a polymer of ethylene that can have a polydispersity index (Mw/Mn) less than or equal to about 20, and a film clarity of a 1 mil film less than or equal to about 30%. This invention further provides, for example, a film comprising this polymer, and a molded product comprising this polymer.

In yet another aspect of this invention, the polymer of ethylene can have a melt index (MI) from about 0.01 to about 10 dg/min, and a film clarity of a 1 mil film less than or equal to about 30%. This invention further provides a film comprising this polymer, and a molded product comprising this polymer.

In a further aspect, the present invention provides, for example, a polymer of ethylene that can have a high load melt index (HLMI) from about 8 to about 180 dg/min, and a film clarity of a 1 mil film less than or equal to about 30%.

In still another aspect, the present invention provides, for example, a polymer of ethylene that can have a film haze of a 1 mil film at least about 60%, and a high load melt index (HLMI) from about 8 to about 180 dg/min.

In another aspect, the present invention provides a method of polymerizing olefins, comprising:
contacting ethylene and at least one olefin comonomer with a catalyst composition under polymerization conditions to form a copolymer;
wherein the catalyst composition comprises the contact product of at least one tightly-bridged metallocene compound, at least one organoaluminum compound, and at least one chemically-treated solid oxide; and
wherein the copolymer has a film clarity of a 1 mil film less than or equal to about 30%.

In still another aspect, the present invention provides a method of polymerizing olefins, comprising:
contacting ethylene and at least one olefin comonomer with a catalyst composition under polymerization conditions to form a copolymer;
wherein the catalyst composition comprises the contact product of at least one tightly-bridged metallocene compound, at least one organoaluminum compound, and at least one chemically-treated solid oxide;
wherein the copolymer has a film haze of a 1 mil film at least about 60%.

In another aspect, the ethylene polymers and copolymers of this invention can be prepared by contacting ethylene, either alone or in combination with a comonomer having from 3 to about 12 carbon atoms.

In one aspect, for example, the tightly-bridged metallocene compound can be selected from a compound having the following formula:

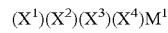

$(X^1)(X^2)(X^3)(X^4)M^1$ wherein $M^1$ is selected from titanium, zirconium, or hafnium;
wherein $(X^1)$ and $(X^2)$ are independently selected from a cyclopentadienyl, an indenyl, or a fluorenyl, any one of which can be substituted or unsubstituted;
wherein $(X^1)$ and $(X^2)$ are connected by a substituted or unsubstituted bridging group comprising:
a) one atom selected from carbon, silicon, germanium, or tin, bonded to both $(X^1)$ and $(X^2)$; or
b) two contiguous carbon atoms in a chain, one end of which is bonded to $(X^1)$ and the other end of which is bonded to $(X^2)$; and
wherein $(X^3)$; $(X^4)$; each substituent on the substituted cyclopentadienyl, the substituted indenyl, and the substituted fluorenyl; and each substituent on the substituted bridging group are independently selected from a hydrocarbyl group, an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, having from 1 to about 30 carbon atoms; a halide; or hydrogen.

In another aspect, the organoaluminum compound can comprise a compound with the formula:

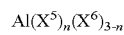

$Al(X^5)_n(X^6)_{3-n}$ wherein $(X^5)$ is a hydrocarbyl having from 1 to about 20 carbon atoms; $(X^6)$ is selected from alkoxide or aryloxide having from 1 to about 20 carbon atoms, halide, or hydride; and n is a number from 1 to 3, inclusive.

In still another aspect, the chemically-treated solid oxide can comprise a material selected from fluorided silica-alumina, fluorided alumina, fluorided silica-titania, fluorided silica-zirconia, chlorided zinc-aluminum oxide, sulfated alumina, or any combination thereof.

In another aspect of this invention, the ethylene polymers and copolymers prepared according to this invention can be characterized, for example, by the following properties: melt index (MI) from about 0.01 to about 10 dg/min; high load melt index (HLMI) from about 8 to about 180 dg/min; polydispersity index (Mw/Mn) less than or equal to about 20; film clarity of a 1 mil film less than or equal to about 30%; and film haze of a 1 mil film at least about 60%. In another aspect, the ethylene polymers and copolymers prepared according to this invention can be further characterized, for example, by a density less than about 0.935 g/cm$^3$, or by a melt strength of a 1 mil film greater than or equal to about 5.0 in.

In yet another aspect of this invention, the ethylene polymers and copolymers prepared according to this invention can be characterized, for example, by the following properties: melt index (MI) from about 0.03 to about 7 dg/min; high load melt index (HLMI) from about 10 to about 150 dg/min; polydispersity index (PDI) (Mw/Mn) less than or equal to about 12; film clarity (C) of a 1 mil film less than or equal to about 20%; and film haze (H) of a 1 mil film at least about 70%.

In still another aspect of this invention, the ethylene polymers and copolymers prepared according to this invention can be characterized, for example, by the following properties: melt index (MI) from about 0.05 to about 5 dg/min; high load melt index (HLMI) from about 11 to about 100 dg/min; polydispersity index (PDI) (Mw/Mn) less than or equal to about 10, and in another aspect, PDI can be less than or equal to about 6; film clarity (C) of a 1 mil film less than or equal to about 10%; and film haze (H) of a 1 mil film at least about 80%, and in another aspect, H of a 1 mil film can be at least about 90%.

This invention, in another aspect, therefore comprises linear low-density polyethylene (LLDPE) resins and films, and ethylene-α-olefin copolymer resins and films, in which the films can be characterized as having a low transparency or high optical opacity (high haze and low clarity).

Additionally, in yet another aspect, this invention can provide an article that comprises the polymer produced with the catalyst composition and according to the methods of this invention.

These and other features, characteristics, and aspects of the present invention will become apparent after a review of the following detailed description, which includes a detailed description of the embodiments of this invention.

BRIEF DESCRIPTION OF THE FIGURES

FIG. 5 presents a graph of haze+(haze÷clarity)−(density− 0.870)×1400 versus haze (%) for cast polyethylene homopolymer and copolymer films prepared according to the present invention, indicating some of the unique properties of the inventive films as compared to conventional polyethylene films, and indicating the opacity properties of films of this invention are not limited to blown films.

FIG. 6 presents a graph of zero shear viscosity versus molecular weight for polyethylene films prepared according to the present invention, indicating some of the unique properties of the inventive films as compared to conventional polyethylene films. The resins labeled D139 and D257 are commercially available polyethylene (PE) resins.

DETAILED DESCRIPTION OF THE INVENTION

Figure 1:
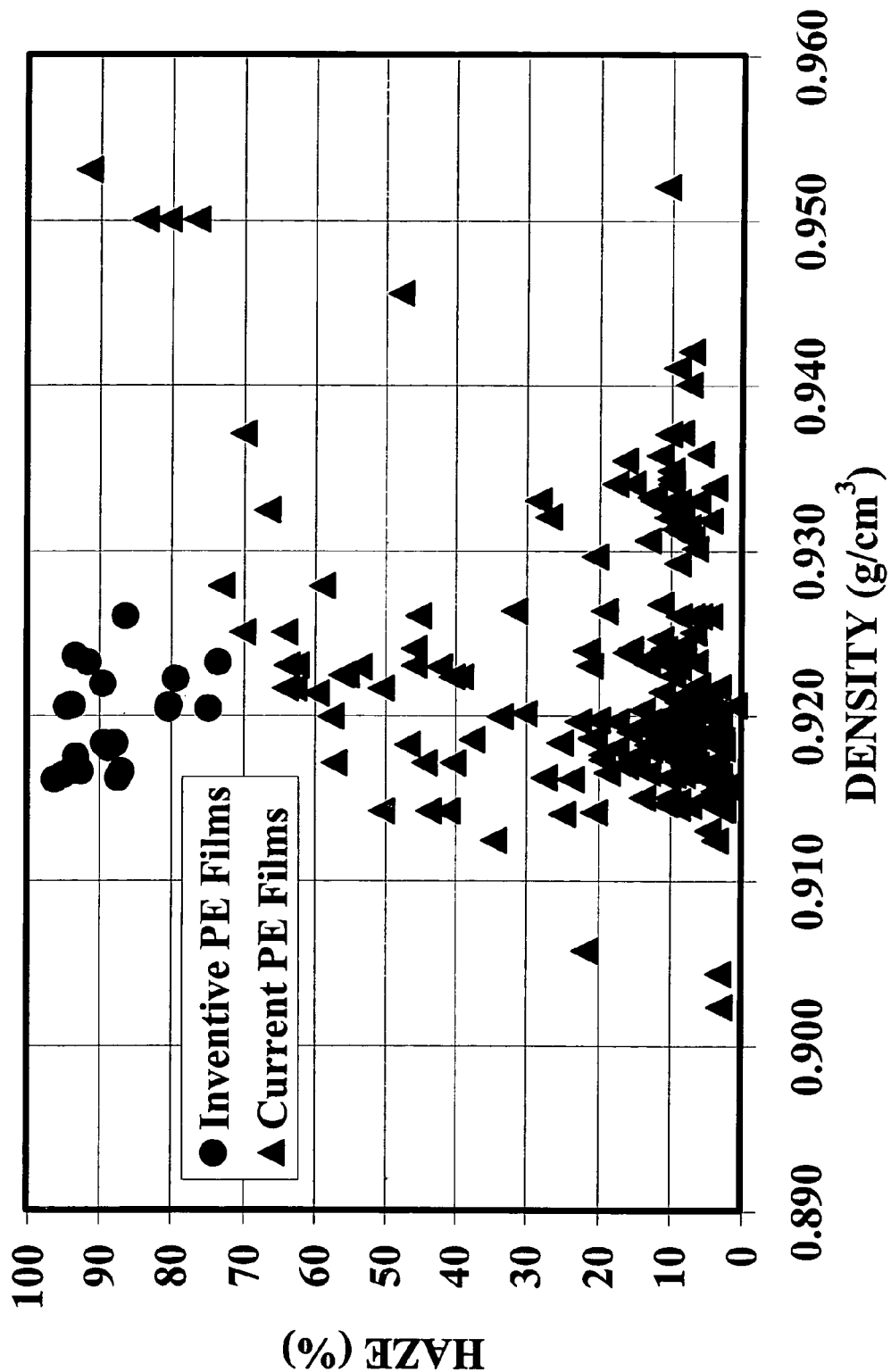
FIG. 1 presents a plot of haze versus density for polyethylene homopolymer and copolymer films prepared according to the present invention, emphasizing the differences in the inventive films and conventional polyethylene films.

The present invention provides catalyst compositions; methods for preparing catalyst compositions; methods for using the catalyst compositions to polymerize olefins; polyolefins; and films and molded products, including multilayer products, comprising the polymers of this invention. In one aspect, this invention encompasses a metallocene catalyst system for polymerizing olefins that provides a useful combination of polyolefin properties, such as melt index, high load melt index, haze, clarity, density, polydispersity, rheological properties, and the like.

In one aspect, for example, the present invention provides methods of making polymer resins and films comprising linear low-density polyethylene (LLDPE) films and ethylene/α-olefin copolymer films having a low transparency (high haze and low clarity). For example, in one aspect of this invention, new metallocene catalyst polyethylene (PE) resins are provided which are suitable for preparing films with low clarity, that are useful in any number of applications, including, but not limited to, packaging applications.

In another aspect, this invention provides ethylene polymers and copolymers that can be characterized, for example, by: a melt index (MI) from about 0.01 to about 10 dg/min; a high load melt index (HLMI) from about 8 to about 180 dg/min; a polydispersity index (Mw/Mn) less than or equal to about 20; a film clarity of a 1 mil film less than or equal to about 30%; and a film haze of a 1 mil film at least about 60%.

Catalyst Compositions and Components

In one aspect, the present invention provides a method of polymerizing olefins, comprising:

contacting ethylene and at least one olefin comonomer with a catalyst composition under polymerization conditions to form a copolymer;

wherein the catalyst composition comprises the contact product of at least one tightly-bridged metallocene compound, at least one organoaluminum compound, and at least one chemically-treated solid oxide. In this aspect, the copolymers prepared accordingly are characterized by a high haze and low clarity.

The Metallocene Compound

As used herein the term metallocene describes a compound comprising two $\eta^5$-cycloalkadienyl-type ligands in the molecule. Thus, the metallocenes of this invention are bridged bis($\eta^5$-cyclopentadienyl-type ligand) compounds, wherein the $\eta^5$-cycloalkadienyl portions include cyclopentadienyl ligands, indenyl ligands, fluorenyl ligands, and the like, including partially saturated or substituted derivatives or analogs of any of these. Possible substituents on these ligands include hydrogen, therefore the description "substituted derivatives thereof" in this invention comprises partially saturated ligands such as tetrahydroindenyl, tetrahydrofluorenyl, octahydrofluorenyl, partially saturated indenyl, partially saturated fluorenyl, substituted partially saturated indenyl, substituted partially saturated fluorenyl, and the like.

Further, the term tightly-bridged metallocene is used herein to describe a metallocene compound in which the two cyclopentadienyl-type ligands in a molecule are linked by a bridging moiety, wherein the shortest chain of the bridging moiety comprises one or two atoms. Thus, the length of the bridge or the chain between the two cyclopentadienyl-type ligands is one or two atoms, although these bridging atoms may be substituted by a variety of substituents such that the bridging moiety itself contains more than one or two atoms.

The metallocene compound of this invention typically comprises a metallocene of titanium, zirconium, and hafnium. In one aspect, the tightly-bridged metallocene compound provided by this invention can have the following formula:

$(X^1)(X^2)(X^3)(X^4)M^1$;

wherein $M^1$ is selected from titanium, zirconium, or hafnium;

wherein $(X^1)$ and $(X^2)$ are independently selected from a cyclopentadienyl, an indenyl, or a fluorenyl, any one of which can be substituted or unsubstituted;

wherein $(X^1)$ and $(X^2)$ are connected by a substituted or unsubstituted bridging group comprising:

a) one atom selected from carbon, silicon, germanium, or tin, bonded to both $(X^1)$ and $(X^2)$; or b) two contiguous carbon atoms in a chain, one end of which is bonded to $(X^1)$ and the other end of which is bonded to $(X^2)$; and wherein $(X^3)$; $(X^4)$; each substituent on the substituted cyclopentadienyl, the substituted indenyl, and the substituted fluorenyl; and each substituent on the substituted bridging group are independently selected from a hydrocarbyl group, an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, having from 1 to about 30 carbon atoms; a halide; or hydrogen.

In another aspect, the two $\eta_5$-cyclopentadienyl-type ligands can typically be bridged by a substituted or unsubstituted bridging group ("bridge") comprising 1 or 2 contiguous ansa carbon atoms in a chain, or 1 ansa silicon atom, wherein one end of the 2-carbon chain is bonded to one $\eta^5$-cyclopentadienyl-type ligand and the other end of the chain is bonded to the other $\eta^5$-cyclopentadienyl-type ligand. Examples of tightly-bridged metallocene compounds of this type include, but are not limited to, a cyclopentadienyl-bridge-cyclopentadienyl compound, a cyclopentadienyl-bridge-indenyl compound, a cyclopentadienyl-bridge-fluorenyl compound, an indenyl-bridge-indenyl compound, an indenyl-bridge-fluorenyl compound, and a fluorenyl-bridge-fluorenyl compound, wherein any one of the $\eta^5$-cyclopentadienyl-type ligands or bridging group may be substituted or unsubstituted.

In another aspect, for example, the tightly-bridged metallocene compound can be a titanium, zirconium, or hafnium metallocene compound of the general type indenyl-bridge-indenyl metallocene compound, having either a rac- or a meso-structure, wherein the bridge between the two $\eta^5$-indenyl ligands can be a $C_1$, $C_2$, or $Si_1$ bridge, and wherein any one of the $\eta^5$-indenyl ligands or bridging group may be substituted or unsubstituted. In another aspect of this invention, the tightly-bridged metallocene compounds of this invention encompass both rac- or a meso-structures, when such structures are possible.

In another aspect of this invention, the tightly-bridged metallocene compound can be selected from a compound having the following formula:

$(X^1)(X^2)(X^3)(X^4)M^1$;

wherein $M^1$ is selected from Zr or Hf;

wherein $(X^1)$ and $(X^2)$ are independently selected from a cyclopentadienyl, an indenyl, or a fluorenyl, any one of which can be substituted or unsubstituted;

wherein $(X^1)$ and $(X^2)$ are connected by a bridging group selected from $>CR^1_2$, $>SiR^1_2$, or $—CR^1_2CR^1_2—$, wherein $R^1$ in each instance is independently selected from a linear, branched, substituted, or unsubstituted hydrocarbyl group, any one of which having from 1 to about 30 carbon atoms; or hydrogen; and wherein any substituent on $(X^1)$, $(X^2)$, or $R^1$ is independently selected from a hydrocarbyl group, an oxygen group, a sulfur group, a nitrogen group, a phosphorus group, an inorganic group, an organometallic group, having from 1 to about 30 carbon atoms; a halide; or hydrogen; and wherein $(X^3)$; $(X^4)$ are independently selected from alkoxide or aryloxide having from 1 to about 30 carbon atoms, halide, or hydride.

In a further aspect, examples of tightly-bridged metallocene compounds that are utilitarian in the present invention include, but are not limited to the following compounds:

rac-ethylenebis(1-indenyl)zirconium dichloride (also named rac-1,2-ethanediylbis($\eta^5$-1-indenyl)dichlorozirconium,

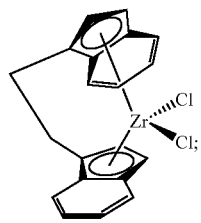

rac-1,2-ethanediylbis($\eta^5$-1-indenyl)di-n-butoxyhafnium,

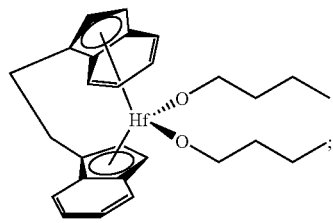

rac-1,2-ethanediylbis(η⁵-1-indenyl)dimethylzirconium,

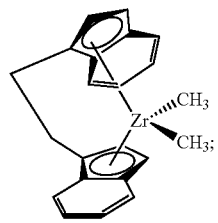

rac-3,3-pentanediylbis(η⁵-4,5,6,7-tetrahydro-1-indenyl) hafnium dichloride,

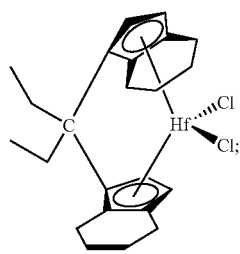

rac-methylphenylsilylbis(η⁵-4,5,6,7-tetrahydro-1-indenyl)zirconium dichloride,

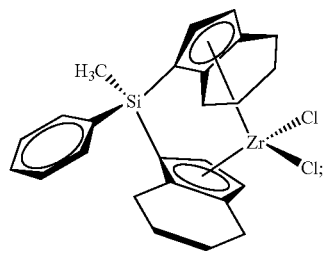

rac-dimethylsilylbis(1-indenyl)zirconium dichloride,

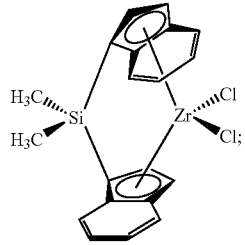

rac-octylphenylsilylbis(1-indenyl)hafnium dichloride,

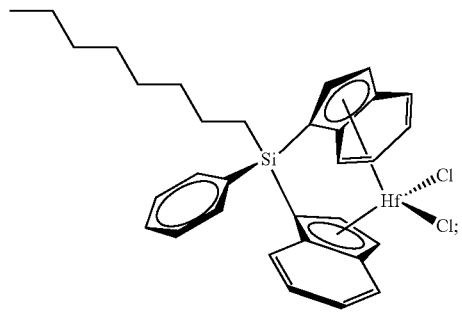

rac-dimethylsilylbis(η⁵-4,5,6,7-tetrahydro-1-indenyl)zirconium dichloride,

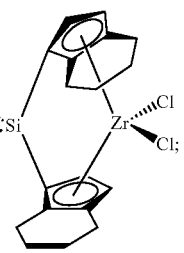

rac-dimethylsilylbis(2-methyl-1-indenyl)zirconium dichloride,

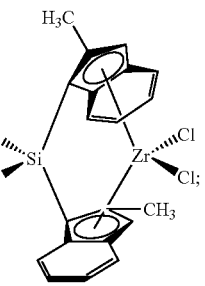

1,2-ethanediylbis(9-fluorenyl)zirconium dichloride,

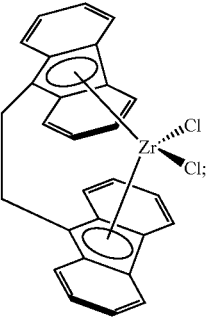

methyloctylsilylbis(9-fluorenyl)zirconium dichloride,

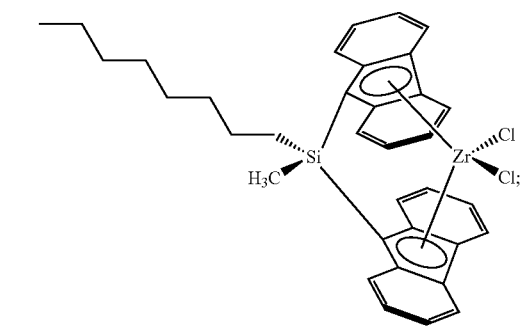

diphenylmethylidene(cyclopentadienyl)(9-fluorenyl)zirconium dichloride,

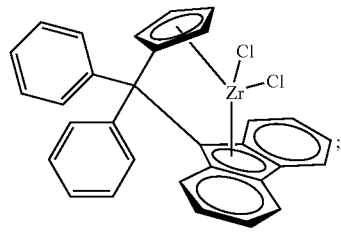

diphenylmethylidene(cyclopentadienyl)(indenyl)zirconium dichloride,

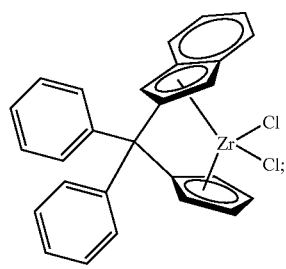

iso-propylidenebis(cyclopentadienyl)zirconium dichloride,

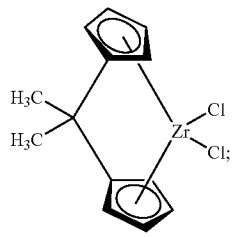

iso-propylidene(cyclopentadienyl)(9-fluorenyl)zirconium dichloride,

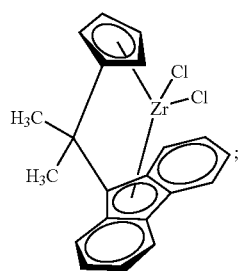

iso-propylidene(3-methylcyclopentadienyl)(9-fluorenyl)zirconium dichloride,

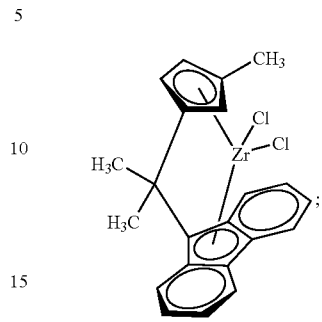

meso-ethylenebis(1-indenyl)zirconium dichloride,

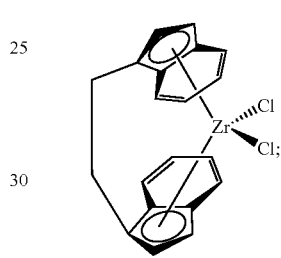

rac-ethylenebis(2-methyl-1-indenyl)zirconium dichloride,

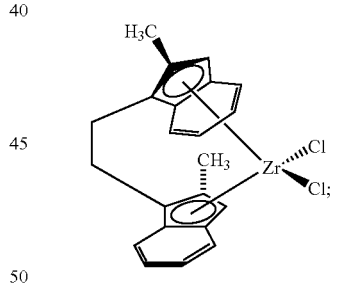

rac-ethylenebis(4,5,6,7-tetrehydro-1-indenyl)zirconium dichloride,

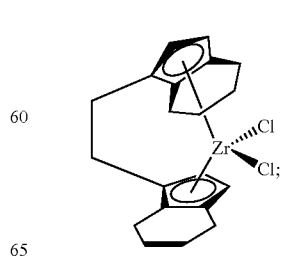

dimethylsilylbis(cyclopentadienyl)zirconium dichloride,

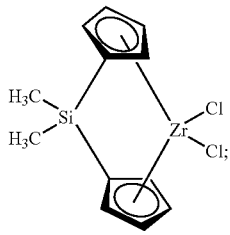

dimethylsilylbis(9-fluorenyl)zirconium dichloride,

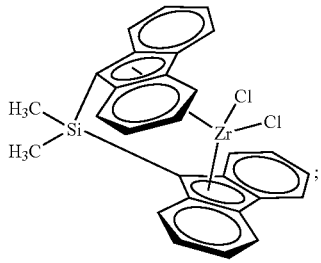

meso-dimethylsilylbis(2-methylindenyl)zirconium dichloride,

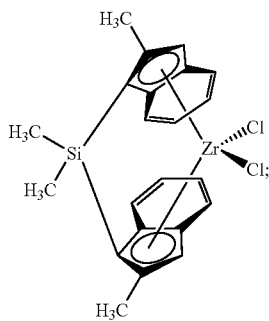

rac-dimethylsilylbis(tetrahydroindenyl)zirconium dichloride,

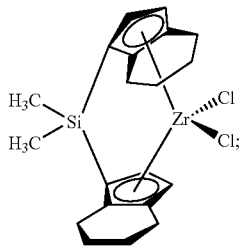

dimethylsilylbis(tetramethylcyclopentadienyl)zirconium dichloride,

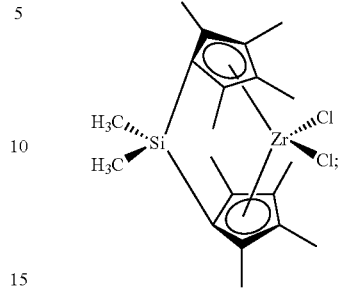

diphenylsilyl(cyclopentadienyl)(9-fluorenyl)zirconium dichloride,

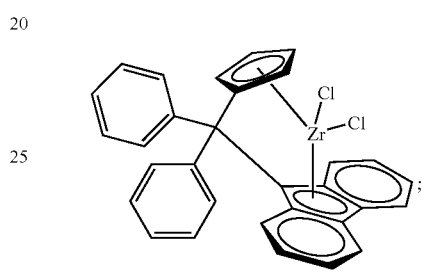

rac-diphenylsilylbis(indenyl)hafnium dichloride,

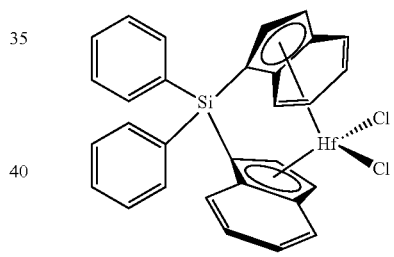

and the like.

In one aspect of this invention, the bridged metallocene can be selected from bridged bis(indenyl)zirconium dihalide compounds, including, but not limited to, rac-ethylenebis(indenyl)zirconium dichloride, dimethylsilyl-bis(indenyl)zirconium dichloride, or a combination thereof.

In another aspect of this invention, the catalyst compositions comprises more than one tightly-bridged metallocene compound of the formula described herein, a organoaluminum compound, and an acidic chemically-treated solid oxide.

Substituents

In one aspect of this invention, the metallocene compounds can comprise a variety of substituents, comprising chemical moieties bonded either to the metal itself as an ($X^3$) or ($X^4$) ligand, or bonded to another portion of the molecule, such as a substituent on a $\eta_5$-cyclopentadienyl-type ligand, a substituent on a bridging group linking two $\eta^5$-cyclopentadienyl-type ligands, or the like.

In this aspect, for example, ($X^3$); ($X^4$); each substituent on the substituted cyclopentadienyl, the substituted indenyl, and the substituted fluorenyl; and each substituent on the substituted bridging group may be independently selected from a hydrocarbyl group, an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, having from 1 to about 30 carbon atoms; a halide; or hydrogen; as long as these groups do not terminate the activity of the catalyst composition. Further, this description can include substituted, unsubstituted, branched, linear, or heteroatom-substituted analogs of these moieties.

Further, this list includes substituents that may be characterized in more than one of these categories such as benzyl. This list also includes hydrogen, therefore the notion of a substituted indenyl and substituted fluorenyl includes partially saturated indenyls and fluorenyls including, but not limited to, tetrahydroindenyls, tetrahydrofluorenyls, and octahydrofluorenyls.

Examples of each of these substituent groups include, but are not limited to, the following groups. In each example presented below, unless otherwise specified, R is independently selected from: an aliphatic group; an aromatic group; a cyclic group; any combination thereof; any substituted derivative thereof, including but not limited to, a halide-, an alkoxide-, or an amide-substituted derivative thereof; any one of which has from 1 to about 30 carbon atoms; or hydrogen. Also included in these groups are any unsubstituted, branched, or linear analogs thereof.

Examples of aliphatic groups, in each instance, include, but are not limited to, an alkyl group, a cycloalkyl group, an alkenyl group, a cycloalkenyl group, an alkynyl group, an alkadienyl group, a cyclic group, and the like, and includes all substituted, unsubstituted, branched, and linear analogs or derivatives thereof, in each instance having from one to about 30 carbon atoms. Thus, aliphatic groups include, but are not limited to, hydrocarbyls such as paraffins and alkenyls. For example, aliphatic groups as used herein include methyl, ethyl, propyl, n-butyl, tert-butyl, sec-butyl, isobutyl, amyl, isoamyl, hexyl, cyclohexyl, heptyl, octyl, nonyl, decyl, dodecyl, 2-ethylhexyl, pentenyl, butenyl, and the like.

Examples of aromatic groups, in each instance, include, but are not limited to, phenyl, naphthyl, anthacenyl, and the like, including substituted derivatives thereof, in each instance having from 6 to about 25 carbons. Substituted derivatives of aromatic compounds include, but are not limited to, tolyl, xylyl, mesityl, and the like, including any heteroatom substituted derivative thereof.

Examples of cyclic groups, in each instance, include, but are not limited to, cycloparaffins, cycloolefins, cycloacetylenes, arenes such as phenyl, bicyclic groups and the like, including substituted derivatives thereof, in each instance having from about 3 to about 30 carbon atoms. Thus heteroatom-substituted cyclic groups such as furanyl are included herein.

In each instance, aliphatic and cyclic groups are groups comprising an aliphatic portion and a cyclic portion, examples of which include, but are not limited to, groups such as: $-(CH_2)_m C_6 H_q R_{5-q}$ wherein m is an integer from 1 to about 10, q is an integer from 1 to 5, inclusive; $-(CH_2)_m C_6 H_q R_{11-q}$ wherein m is an integer from 1 to about 10, q is an integer from 1 to 11, inclusive; and $(CH_2)_m C_5 H_q R_{9-q}$ wherein m is an integer from 1 to about 10, q is an integer from 1 to 9, inclusive. In each instance and as defined above, R is independently selected from: an aliphatic group; an aromatic group; a cyclic group; any combination thereof; any substituted derivative thereof, including but not limited to, a halide-, an alkoxide-, or an amide-substituted derivative thereof; any one of which has from 1 to about 30 carbon atoms; or hydrogen. In one aspect, aliphatic and cyclic groups include, but are not limited to: $-CH_2C_6H_5$; $-CH_2C_6H_4F$; $-CH_2C_6H_4Cl$; $-CH_2C_6H_4Br$; $-CH_2C_6H_4I$; $-CH_2C_6H_4OMe$; $-CH_2C_6H_4OEt$; $-CH_2C_6H_4NH_2$; $-CH_2C_6H_4NMe_2$; $-CH_2C_6H_4NEt_2$; $-CH_2CH_2C_6H_5$; $-CH_2CH_2C_6H_4F$; $-CH_2CH_2C_6H_4Cl$; $-CH_2CH_2C_6H_4Br$; $-CH_2CH_2C_6H_4I$; $-CH_2CH_2C_6H_4OMe$; $-CH_2CH_2C_6H_4OEt$; $-CH_2CH_2C_6H_4NH_2$; $-CH_2CH_2C_6H_4NMe_2$; $-CH_2CH_2C_6H_4NEt_2$; any regioisomer thereof, and any substituted derivative thereof.

Examples of halides, in each instance, include fluoride, chloride, bromide, and iodide.

In each instance, oxygen groups are oxygen-containing groups, examples of which include, but are not limited to, alkoxy or aryloxy groups ($-OR$), $-OC(O)R$, $-OC(O)H$, $-OSiR_3$, $-OPR_2$, $-OAlR_2$, $-OBR_2$, and the like, including substituted derivatives thereof, wherein R in each instance is selected from alkyl, cycloalkyl, aryl, aralkyl, substituted alkyl, substituted aryl, or substituted aralkyl having from 1 to about 30 carbon atoms. Examples of alkoxy or aryloxy groups ($-OR$) groups include, but are not limited to, methoxy, ethoxy, propoxy, butoxy, phenoxy, substituted phenoxy, and the like.

In each instance, sulfur groups are sulfur-containing groups, examples of which include, but are not limited to, $-SR$, $-OSO_2R$, $-OSO_2OR$, $-SCN$, $-SO_2R$, and the like, including substituted derivatives thereof, wherein R in each instance is selected from alkyl, cycloalkyl, aryl, aralkyl, substituted alkyl, substituted aryl, or substituted aralkyl having from 1 to about 30 carbon atoms.

In each instance, nitrogen groups are nitrogen-containing groups, which include, but are not limited to, $-NH_2$, $-NHR$, $-NR_2$, $-NO_2$, $-N_3$, and the like, including substituted derivatives thereof, wherein R in each instance is selected from alkyl, cycloalkyl, aryl, aralkyl, substituted alkyl, substituted aryl, or substituted aralkyl having from 1 to about 30 carbon atoms.

In each instance, phosphorus groups are phosphorus-containing groups, which include, but are not limited to, $-PH_2$, $-PHR$, $-PR_2$, $-P(O)R_2$, $-P(OR)_2$, $-P(O)(OR)_2$, and the like, including substituted derivatives thereof, wherein R in each instance is selected from alkyl, cycloalkyl, aryl, aralkyl, substituted alkyl, substituted aryl, or substituted aralkyl having from 1 to about 30 carbon atoms.

In each instance, arsenic groups are arsenic-containing groups, which include, but are not limited to, $-AsHR$, $-AsR_2$, $-As(O)R_2$, $-As(OR)_2$, $-As(O)(OR)_2$, and the like, including substituted derivatives thereof, wherein R in each instance is selected from alkyl, cycloalkyl, aryl, aralkyl, substituted alkyl, substituted aryl, or substituted aralkyl having from 1 to about 30 carbon atoms.

In each instance, carbon groups are carbon-containing groups, which include, but are not limited to, alkyl halide groups that comprise halide-substituted alkyl groups with 1 to about 30 carbon atoms, aralkyl groups with 1 to about 30 carbon atoms, $-C(O)H$, $-C(O)R$, $-C(O)OR$, cyano, $-C(NR)H$, $-C(NR)R$, $-C(NR)OR$, and the like, including substituted derivatives thereof, wherein R in each instance is selected from alkyl, cycloalkyl, aryl, aralkyl, substituted alkyl, substituted aryl, or substituted aralkyl having from 1 to about 30 carbon atoms.

In each instance, silicon groups are silicon-containing groups, which include, but are not limited to, silyl groups such alkylsilyl groups, arylsilyl groups, arylalkylsilyl groups, siloxy groups, and the like, which in each instance have from 1 to about 30 carbon atoms. For example, silicon groups include trimethylsilyl and phenyloctylsilyl groups.

In each instance, germanium groups are germanium-containing groups, which include, but are not limited to, germyl groups such alkylgermyl groups, arylgermyl groups, arylalkylgermyl groups, germyloxy groups, and the like, which in each instance have from 1 to about 30 carbon atoms.

In each instance, tin groups are tin-containing groups, which include, but are not limited to, stannyl groups such alkylstannyl groups, arylstannyl groups, arylalkylstannyl groups, stannoxy (or "stannyloxy") groups, and the like, which in each instance have from 1 to about 30 carbon atoms. Thus, tin groups include, but are not limited to, stannoxy groups.

In each instance, lead groups are lead-containing groups, which include, but are not limited to, alkyllead groups, aryllead groups, arylalkyllead groups, and the like, which in each instance, have from 1 to about 30 carbon atoms.

In each instance, boron groups are boron-containing groups, which include, but are not limited to, —$BR_2$, —$BX_2$, —BRX, wherein X is a monoanionic group such as halide, hydride, alkoxide, alkyl thiolate, and the like, and wherein R in each instance is selected from alkyl, cycloalkyl, aryl, aralkyl, substituted alkyl, substituted aryl, or substituted aralkyl having from 1 to about 30 carbon atoms. Boron groups further include boron-containing substituents in which the boron atom is not directly bonded to the ligand, bridging group, or metal, such as dialkylboron oxo moieties ($R_2BO$—).

In each instance, aluminum groups are aluminum-containing groups, which include, but are not limited to, —$AlR_2$, —$AlX_2$, —AlRX, wherein X is a monoanionic group such as halide, hydride, alkoxide, alkyl thiolate, and the like, and wherein R in each instance is selected from alkyl, cycloalkyl, aryl, aralkyl, substituted alkyl, substituted aryl, or substituted aralkyl having from 1 to about 30 carbon atoms.

Examples of inorganic groups that may be used as substituents for substituted cyclopentadienyls, substituted indenyls, substituted fluorenyls, and substituted boratabenzenes, in each instance, include, but are not limited to, —$SO_2X$, —$OAlX_2$, —$OSiX_3$, —$OPX_2$, —SX, —$OSO_2X$, —$AsX_2$, —$As(O)X_2$, —$PX_2$, and the like, wherein X is a monoanionic group such as halide, hydride, amide, alkoxide, alkyl thiolate, and the like, and wherein any alkyl, cycloalkyl, aryl, aralkyl, substituted alkyl, substituted aryl, or substituted aralkyl group or substituent on these ligands has from 1 to about 30 carbon atoms.

Examples of organometallic groups that may be used as substituents for substituted cyclopentadienyls, substituted indenyls, and substituted fluorenyls, in each instance, include, but are not limited to, organoboron groups, organoaluminum groups, organogallium groups, organosilicon groups, organogermanium groups, organotin groups, organolead groups, organo-transition metal groups, and the like, having from 1 to about 30 carbon atoms.

Numerous processes to prepare metallocene compounds that can be employed in this invention have been reported. For example, U.S. Pat. Nos. 4,939,217, 5,191,132, 5,210,352, 5,347,026, 5,399,636, 5,401,817, 5,420,320, 5,436,305, 5,451,649, 5,496,781, 5,498,581, 5,541,272, 5,554,795, 5,563,284, 5,565,592, 5,571,880, 5,594,078, 5,631,203, 5,631,335, 5,654,454, 5,668,230, 5,705,579, and 6,509,427 describe such methods, each of which is incorporated by reference herein, in its entirety. Other processes to prepare metallocene compounds that can be employed in this invention have been reported in references such as: Köppl, A. Alt, H. G. *J. Mol. Catal A.* 2001, 165, 23; Kajigaeshi, S.; Kadowaki, T.; Nishida, A.; Fujisaki, S. *The Chemical Society of Japan*, 1986, 59, 97; Alt, H. G.; Jung, M.; Kehr, G. *J. Organomet. Chem.* 1998, 562, 153–181; and Alt, H. G.; Jung, M. *J. Organomet. Chem.* 1998, 568, 87–112; each of which is incorporated by reference herein, in its entirety. Further, additional processes to prepare metallocene compounds that can be employed in this invention have been reported in: *Journal of Organometallic Chemistry*, 1996, 522, 39–54, which is incorporated by reference herein, in its entirety. The following treatises also describe such methods: Wailes, P. C.; Coutts, R. S. P.; Weigold, H. in Organometallic Chemistry of Titanium, Zirconium, and Hafnium, Academic; New York, 1974.; Cardin, D. J.; Lappert, M. F.; and Raston, C. L.; Chemistry of Organo-Zirconium and -Hafnium Compounds; Halstead Press; New York, 1986; each of which is incorporated by reference herein, in its entirety.

In one aspect, ($X^3$) and ($X^4$) can be selected from halides, alkoxides, other oxides such as siloxides, stannoxides, dialkylboron oxo moieties ($R_2BO$—), or hydrocarbyls having from 1 to about 20 carbon atoms. In this aspect, for example, ($X^3$) and ($X^4$) are typically selected from fluoro, chloro, bromo, iodo, ethoxide, dialkylboron oxo ($R_2BO$—) or methyl.

In another aspect, at least one substituent on ($X^1$) and ($X^2$) typically comprises a bridging group that connects or bridges the ($X^1$) and ($X^2$) ligands. Examples of bridging groups include, but are not limited to, aliphatic groups, cyclic groups, combinations of aliphatic groups and cyclic groups, phosphorous groups, nitrogen groups, organometallic groups, silicon, phosphorus, boron, germanium, and the like. Examples of aliphatic groups that can serve as bridges between ($X^1$) and ($X^2$) include, but are not limited to, hydrocarbyls, such as paraffins and olefins. Examples of cyclic groups that can serve as bridges between ($X^1$) and ($X^2$) include, but are not limited to, cycloparaffins, cycloolefins, cycloacetylenes, arenes, and the like. Examples of organometallic groups that can serve as bridges between ($X^1$) and ($X^2$) include, but are not limited to, substituted silyl derivatives, substituted tin groups, substituted germanium groups, substituted boron groups, and the like.

In one aspect, for example, the ($X^1$) ligand can typically comprise an indenyl group, and often, the ($X^2$) ligand can be an indenyl group connected by a bridging group to ($X^1$). For example, when ($X^1$) and ($X^2$) are both indenyl groups, the bridge connecting the two indenyl groups may be substituted or unsubstituted, and is typically selected from an α,Ω-alkylene radical or a dialkylsilyl radical. The total length of the bridge between ($X^1$) and ($X^2$) does not exceed two atoms, and these atoms can also have substituents. For example, bridging groups between ($X^1$) and ($X^2$) include, but are not limited to, —$CH_2CH_2$—, —$CH_2$—, —$C(CH_3)_2$—, —$Si(CH_3)_2$—, and the like. Typically, the bridging ligand is selected from an 1,2-ethylene radical or a dimethylsilyl radical.

The Chemically Treated Solid Oxide

In one aspect, the present invention provides a method of polymerizing olefins, comprising:

contacting ethylene and at least one olefin comonomer with a catalyst composition under polymerization conditions to form a copolymer;

wherein the catalyst composition comprises the contact product of at least one tightly-bridged ansa metallocene compound, at least one organoaluminum compound, and at least one chemically-treated solid oxide. The copolymers prepared accordingly can be characterized by a high haze and low clarity. Thus, in this aspect, the present invention encompasses catalyst compositions comprising a chemically-treated solid oxide which serves as an acidic activator-support, and which is typically used in combination with an organoaluminum compound.

In one aspect of this invention, the catalyst composition can comprise at least one chemically-treated solid oxide comprising at least one solid oxide treated with at least one electron-withdrawing anion, wherein the solid oxide can comprise any oxide that is characterized by a high surface area, and the electron-withdrawing anion can comprise any anion that increases the acidity of the solid oxide as compared to the solid oxide that is not treated with at least one electron-withdrawing anion.

In another aspect of this invention, the catalyst composition comprises a chemically-treated solid oxide comprising a solid oxide treated with an electron-withdrawing anion, wherein:

the solid oxide is selected from silica, alumina, silica-alumina, aluminum phosphate, heteropolytungstates, titania, zirconia, magnesia, boria, zinc oxide, mixed oxides thereof, or mixtures thereof, and the electron-withdrawing anion is selected from fluoride, chloride, bromide, phosphate, triflate, bisulfate, sulfate, fluorophosphate, fluorosulfate, or any combination thereof. In another aspect, for example, the chemically-treated solid oxide can be selected from fluorided alumina, chlorided alumina, bromided alumina, sulfated alumina, fluorided silica-alumina, chlorided silica-alumina, bromided silica-alumina, sulfated silica-alumina, fluorided silica-titania, fluorided silica-zirconia, chlorided silica-zirconia, bromided silica-zirconia, sulfated silica-zirconia, chlorided zinc-aluminum oxide, or any combination thereof. Futher, and in yet another aspect, the chemically-treated solid oxide can further comprise a metal or metal ion selected from zinc, nickel, vanadium, silver, copper, gallium, tin, tungsten, molybdenum, or any combination thereof.

In one aspect, the chemically-treated solid oxide can be selected from fluorided silica-alumina, fluorided alumina, fluorided silica-titania, fluorided silica-zirconia, chlorided zinc-aluminum oxide, sulfated alumina, or any combination thereof.

The chemically-treated solid oxide typically comprises the contact product of at least one solid oxide compound and at least one electron-withdrawing anion source. In one aspect, the solid oxide compound comprises an inorganic oxide. It is not required that the solid oxide compound be calcined prior to contacting the electron-withdrawing anion source. The contact product may be calcined either during or after the solid oxide compound is contacted with the electron-withdrawing anion source. In this aspect, the solid oxide compound may be calcined or uncalcined. In another aspect, the activator-support may comprise the contact product of at least one calcined solid oxide compound and at least one electron-withdrawing anion source.

The chemically-treated solid oxide, also termed the activator-support, exhibits enhanced acidity as compared to the corresponding untreated solid oxide compound. The chemically-treated solid oxide also functions as a catalyst activator as compared to the corresponding untreated solid oxide. While the chemically-treated solid oxide activates the metallocene in the absence of cocatalysts, it is not necessary to eliminate cocatalysts from the catalyst composition. The activation function of the activator-support is evident in the enhanced activity of catalyst composition as a whole, as compared to a catalyst composition containing the corresponding untreated solid oxide. However, it is believed that the chemically-treated solid oxide can function as an activator, even in the absence of an organoaluminum compound, aluminoxanes, organoboron compounds, or ionizing ionic compounds.

In one aspect, the chemically-treated solid oxide of this invention comprises a solid inorganic oxide material, a mixed oxide material, or a combination of inorganic oxide materials, that is chemically-treated with an electron-withdrawing component, and optionally treated with a metal. Thus, the solid oxide of this invention encompasses oxide materials such as alumina, "mixed oxide" compounds thereof such as silica-alumina, and combinations and mixtures thereof. The mixed oxide compounds such as silica-alumina can be single or multiple chemical phases with more than one metal combined with oxygen to form a solid oxide compound, and are encompassed by this invention.

In one aspect of this invention, the chemically-treated solid oxide further comprises a metal or metal ion selected from zinc, nickel, vanadium, titanium, silver, copper, gallium, tin, tungsten, molybdenum, or any combination thereof. Examples of chemically-treated solid oxides that further comprise a metal or metal ion include, but are not limited to, zinc-impregnated chlorided alumina, titanium-impregnated fluorided alumina, zinc-impregnated fluorided alumina, zinc-impregnated chlorided silica-alumina, zinc-impregnated fluorided silica-alumina, zinc-impregnated sulfated alumina, chlorided zinc aluminate, fluorided zinc aluminate, sulfated zinc aluminate, or any combination thereof.

In another aspect, the chemically-treated solid oxide of this invention comprises a solid oxide of relatively high porosity, which exhibits Lewis acidic or Brønsted acidic behavior. The solid oxide is chemically-treated with an electron-withdrawing component, typically an electron-withdrawing anion, to form a activator-support. While not intending to be bound by the following statement, it is believed that treatment of the inorganic oxide with an electron-withdrawing component augments or enhances the acidity of the oxide. Thus in one aspect, the activator-support exhibits Lewis or Brønsted acidity which is typically greater than the Lewis or Brønsted acid strength than the untreated solid oxide, or the activator-support has a greater number of acid sites than the untreated solid oxide, or both. One method to quantify the acidity of the chemically-treated and untreated solid oxide materials is by comparing the polymerization activities of the treated and untreated oxides under acid catalyzed reactions.

In one aspect, the chemically-treated solid oxide comprises a solid inorganic oxide comprising oxygen and at least one element selected from Group 2, 3, 4, 5, 6, 7, 8, 9, 10, 11, 12, 13, 14, or 15 of the periodic table, or comprising oxygen and at least one element selected from the lanthanide or actinide elements. (See: *Hawley's Condensed Chemical Dictionary*, 11$^{th}$ Ed., John Wiley & Sons; 1995; Cotton, F. A.; Wilkinson, G.; Murillo; C. A.; and Bochmann; M. *Advanced Inorganic Chemistry*, 6$^{th}$ Ed., Wiley-Interscience, 1999.) Usually, the inorganic oxide comprises oxygen and at least one element selected from Al, B, Be, Bi, Cd, Co, Cr, Cu, Fe, Ga, La, Mn, Mo, Ni, Sb, Si, Sn, Sr, Th, Ti, V, W, P, Y, Zn or Zr.

Suitable examples of solid oxide materials or compounds that can be used in the chemically-treated solid oxide of the present invention include, but are not limited to, $Al_2O_3$, $B_2O_3$, BeO, $Bi_2O_3$, CdO, $Co_3O_4$, $Cr_2O_3$, CuO, $Fe_2O_3$, $La_2O_3$, $Mn_2O_3$, $MoO_3$, NiO, $P_2O_5$, $Sb_2O_5$, $SiO_2$, $SnO_2$, SrO, $ThO_2$, $TiO_2$, $V_2O_5$, $WO_3$, $Y_2O_3$, ZnO, $ZrO_2$, and the like, including mixed oxides thereof, and combinations thereof. Examples of mixed oxides that can be used in the activator-support of the present invention include, but are not limited to, silica-alumina, silica-titania, silica-zirconia, zeolites, many clay minerals, alumina-titania, alumina-zirconia, zinc-aluminate and the like.

In one aspect of this invention, the solid oxide material is chemically-treated by contacting it with at least one electron-withdrawing component, typically an electron-withdrawing anion source. Further, the solid oxide material is optionally chemically-treated with a metal ion, then calcined to form a metal-containing or metal-impregnated chemically-treated solid oxide. Alternatively, a solid oxide material and an electron-withdrawing anion source are contacted and calcined simultaneously. The method by which the oxide is contacted with an electron-withdrawing component, typically a salt or an acid of an electron-withdrawing anion, includes, but is not limited to, gelling, co-gelling, impregnation of one compound onto another, and the like. Typically, following any contacting method, the contacted mixture of oxide compound, electron-withdrawing anion, and optionally the metal ion is calcined.

The electron-withdrawing component used to treat the oxide is any component that increases the Lewis or Brønsted acidity of the solid oxide upon treatment. In one aspect, the electron-withdrawing component is an electron-withdrawing anion derived from a salt, an acid, or other compound such as a volatile organic compound that may serve as a source or precursor for that anion. Examples of electron-withdrawing anions include, but are not limited to, sulfate, bisulfate, fluoride, chloride, bromide, iodide, fluorosulfate, fluoroborate, phosphate, fluorophosphate, trifluoroacetate, triflate, fluorozirconate, fluorotitanate, trifluoroacetate, triflate, and the like, including mixtures and combinations thereof. In addition, other ionic or non-ionic compounds that serve as sources for these electron-withdrawing anions may also be employed in the present invention.

When the electron-withdrawing component comprises a salt of an electron-withdrawing anion, the counterion or cation of that salt may be selected from any cation that allows the salt to revert or decompose back to the acid during calcining. Factors that dictate the suitability of the particular salt to serve as a source for the electron-withdrawing anion include, but are not limited to, the solubility of the salt in the desired solvent, the lack of adverse reactivity of the cation, ion-pairing effects between the cation and anion, hygroscopic properties imparted to the salt by the cation, and the like, and thermal stability of the anion. Examples of suitable cations in the salt of the electron-withdrawing anion include, but are not limited to, ammonium, trialkyl ammonium, tetraalkyl ammonium, tetraalkyl phosphonium, $H^+$, $[H(OEt_2)_2]^+$, and the like.

Further, combinations of one or more different electron withdrawing anions, in varying proportions, can be used to tailor the specific acidity of the activator-support to the desired level. Combinations of electron withdrawing components may be contacted with the oxide material simultaneously or individually, and any order that affords the desired chemically-treated solid oxide acidity. For example, one aspect of this invention is employing two or more electron-withdrawing anion source compounds in two or more separate contacting steps. Thus, one example of such a process by which an chemically-treated solid oxide is prepared is as follows: a selected solid oxide compound, or combination of oxide compounds, is contacted with a first electron-withdrawing anion source compound to form a first mixture, this first mixture is then calcined, the calcined first mixture is then contacted with a second electron-withdrawing anion source compound to form a second mixture, followed by calcining said second mixture to form a treated solid oxide compound. In such a process, the first and second electron-withdrawing anion source compounds are typically different compounds, although they may be the same compound.

In one aspect of the invention, the solid oxide activator-support (chemically-treated solid oxide) may be produced by a process comprising:

1) contacting a solid oxide compound with at least one electron-withdrawing anion source compound to form a first mixture; and 2) calcining the first mixture to form the solid oxide activator-support.

In another aspect of this invention, the solid oxide activator-support (chemically-treated solid oxide) is produced by a process comprising:

1) contacting at least one solid oxide compound with a first electron-withdrawing anion source compound to form a first mixture; and 2) calcining the first mixture to produce a calcined first mixture;

3) contacting the calcined first mixture with a second electron-withdrawing anion source compound to form a second mixture; and 4) calcining the second mixture to form the solid oxide activator-support. Thus, the solid oxide activator-support is sometimes referred to simply as a treated solid oxide compound.

Another aspect of this invention is producing or forming the chemically-treated solid oxide by contacting at least one solid oxide with at least one electron-withdrawing anion source compound, wherein the at least one solid oxide compound is calcined before, during or after contacting the electron-withdrawing anion source, and wherein there is a substantial absence of aluminoxanes and organoborates.

In one aspect of this invention, once the solid oxide has been treated and dried, it may be subsequently calcined. Calcining of the treated solid oxide is generally conducted in an ambient atmosphere, typically in a dry ambient atmosphere, at a temperature from about 200° C. to about 900° C., and for a time of about 1 minute to about 100 hours. In another aspect, calcining is conducted at a temperature from about 300° C. to about 800° C. and in another aspect, calcining is conducted at a temperature from about 400° C. to about 700° C. In yet another aspect, calcining is conducted from about 1 hour to about 50 hours, and in another aspect calcining is conducted, from about 3 hours to about 20 hours. In still another aspect, calcining may be carried out from about 1 to about 10 hours at a temperature from about 350° C. to about 550° C.

Further, any type of suitable ambient can be used during calcining. Generally, calcining is conducted in an oxidizing atmosphere, such as air. Alternatively, an inert atmosphere, such as nitrogen or argon, or a reducing atmosphere such as hydrogen or carbon monoxide, may be used.

In another aspect of the invention, the solid oxide component used to prepare the chemically-treated solid oxide has a pore volume greater than about 0.1 cc/g. In another aspect, the solid oxide component has a pore volume greater than about 0.5 cc/g, and in yet another aspect, greater than about 1.0 cc/g. In still another aspect, the solid oxide component has a surface area from about 100 to about 1000 m²/g. In another aspect, solid oxide component has a surface area from about 200 to about 800 m²/g, and in still another aspect, from about 250 to about 600 m²/g.

The solid oxide material may be treated with a source of halide ion or sulfate ion, or a combination of anions, and optionally treated with a metal ion, then calcined to provide the chemically-treated solid oxide in the form of a particulate solid. In one aspect, the solid oxide material is treated with a source of sulfate, termed a sulfating agent, a source of chloride ion, termed a chloriding agent, a source of fluoride ion, termed a fluoriding agent, or a combination thereof, and calcined to provide the solid oxide activator. In another aspect, useful acidic activator-supports include, but are not limited to: bromided alumina; chlorided alumina; fluorided alumina; sulfated alumina; bromided silica-alumina, chlorided silica-alumina; fluorided silica-alumina; sulfated silica-alumina; bromided silica-zirconia, chlorided silica-zirconia; fluorided silica-zirconia; sulfated silica-zirconia; fluorided silica-titania; chlorided zinc-aluminum oxide; a pillared clay such as a pillared montmorillonite, optionally treated with fluoride, chloride, or sulfate; phosphated alumina, or other aluminophosphates, optionally treated with sulfate, fluoride, or chloride; or any combination thereof. Further, any of the activator-supports may optionally be treated with a metal ion.

In one aspect of this invention, the chemically-treated solid oxide comprises a fluorided solid oxide in the form of a particulate solid, thus a source of fluoride ion is added to the oxide by treatment with a fluoriding agent. In still another aspect, fluoride ion may be added to the oxide by forming a slurry of the oxide in a suitable solvent such as alcohol or water, including, but are not limited to, the one to three carbon alcohols because of their volatility and low surface tension. Examples of fluoriding agents that can be used in this invention include, but are not limited to, hydrofluoric acid (HF), ammonium fluoride ($NH_4F$), ammonium bifluoride ($NH_4HF_2$), ammonium tetrafluoroborate ($NH_4BF_4$), ammonium silicofluoride (hexafluorosilicate) (($NH_4)_2SiF_6$), ammonium hexafluorophosphate ($NH_4 PF_6$), analogs thereof, and combinations thereof. For example, ammonium bifluoride $NH_4HF_2$ may be used as the fluoriding agent, due to its ease of use and ready availability.

In another aspect of the present invention, the solid oxide can be treated with a fluoriding agent during the calcining step. Any fluoriding agent capable of thoroughly contacting the solid oxide during the calcining step can be used. For example, in addition to those fluoriding agents described previously, volatile organic fluoriding agents may be used. Examples of volatile organic fluoriding agents useful in this aspect of the invention include, but are not limited to, freons, perfluorohexane, perfluorobenzene, fluoromethane, trifluoroethanol, and combinations thereof. Gaseous hydrogen fluoride or fluorine itself can also be used with the solid oxide is fluorided during calcining. One convenient method of contacting the solid oxide with the fluoriding agent is to vaporize a fluoriding agent into a gas stream used to fluidize the solid oxide during calcination.

Similarly, in another aspect of this invention, the chemically-treated solid oxide can comprise a chlorided solid oxide in the form of a particulate solid, thus a source of chloride ion is added to the oxide by treatment with a chloriding agent. The chloride ion may be added to the oxide by forming a slurry of the oxide in a suitable solvent. In another aspect of the present invention, the solid oxide can be treated with a chloriding agent during the calcining step. Any chloriding agent capable of serving as a source of chloride and thoroughly contacting the oxide during the calcining step can be used. For example, volatile organic chloriding agents may be used. Examples of volatile organic chloriding agents useful in this aspect of the invention include, but are not limited to, certain freons, perchlorobenzene, chloromethane, dichloromethane, chloroform, carbon tetrachloride, trichloroethanol, or any combination thereof. Gaseous hydrogen chloride or chlorine itself can also be used with the solid oxide during calcining. One convenient method of contacting the oxide with the chloriding agent is to vaporize a chloriding agent into a gas stream used to fluidize the solid oxide during calcination.

In one aspect, the amount of fluoride or chloride ion present before calcining the solid oxide is generally from about 2 to about 50% by weight, where the weight percents are based on the weight of the solid oxide, for example silica-alumina, before calcining. In another aspect, the the amount of fluoride or chloride ion present before calcining the solid oxide is from about 3 to about 25% by weight, and in another aspect, from about 4 to about 20% by weight. Once impregnated with halide, the halided oxide may be dried by any method known in the art including, but not limited to, suction filtration followed by evaporation, drying under vacuum, spray drying, and the like, although it is also possible to initiate the calcining step immediately without drying the impregnated solid oxide.

The silica-alumina used to prepare the treated silica-alumina can have a pore volume greater than about 0.5 cc/g. In one aspect, the pore volume may be greater than about 0.8 cc/g, and in another aspect, the pore volume may be greater than about 1.0 cc/g. Further, the silica-alumina may have a surface area greater than about 100 m²/g. In one aspect, the surface area is greater than about 250 m²/g, and in another aspect, the surface area may be greater than about 350 m²/g. Generally, the silica-alumina of this invention has an alumina content from about 5 to about 95%. In one aspect, the alumina content of the silica-alumina may be from about 5 to about 50%, and in another aspect, the alumina content of the silica-alumina may be from about 8% to about 30% alumina by weight. In yet another aspect, the solid oxide component can comprise alumina without silica and in another aspect, the solid oxide component can comprise silica without alumina.

The sulfated solid oxide comprises sulfate and a solid oxide component such as alumina or silica-alumina, in the form of a particulate solid. Optionally, the sulfated oxide is further treated with a metal ion such that the calcined sulfated oxide comprises a metal. In one aspect, the sulfated solid oxide comprises sulfate and alumina. In one aspect of this invention, the sulfated alumina is formed by a process wherein the alumina is treated with a sulfate source, for example selected from, but not limited to, sulfuric acid or a sulfate salt such as ammonium sulfate. In one aspect, this process may be performed by forming a slurry of the alumina in a suitable solvent such as alcohol or water, in which the desired concentration of the sulfating agent has been added. Suitable organic solvents include, but are not limited to, the one to three carbon alcohols because of their volatility and low surface tension.

In one aspect of the invention, the amount of sulfate ion present before calcining is generally from about 0.5 parts by weight to about 100 parts by weight sulfate ion to about 100 parts by weight solid oxide. In another aspect, the amount of sulfate ion present before calcining is generally from about 1 part by weight to about 50 parts by weight sulfate ion to about 100 parts by weight solid oxide, and in still another aspect, from about 5 parts by weight to about 30 parts by weight sulfate ion to about 100 parts by weight solid oxide.

These weight ratios are based on the weight of the solid oxide before calcining. Once impregnated with sulfate, the sulfated oxide may be dried by any method known in the art including, but not limited to, suction filtration followed by evaporation, drying under vacuum, spray drying, and the like, although it is also possible to initiate the calcining step immeditately.

In addition to being treated with an electron-withdrawing component such as halide or sulfate ion, the solid inorganic oxide of this invention may optionally be treated with a metal source, including metal salts or metal-containing compounds. In one aspect of the invention, these compounds may be added to or impregnated onto the solid oxide in solution form, and subsequently converted into the supported metal upon calcining. Accordingly, the solid inorganic oxide can further comprise a metal selected from zinc, titanium, nickel, vanadium, silver, copper, gallium, tin, tungsten, molybdenum, or a combination thereof. For example, zinc may be used to impregnate the solid oxide because it provides good catalyst activity and low cost. The solid oxide may be treated with metal salts or metal-containing compounds before, after, or at the same time that the solid oxide is treated with the electron-withdrawing anion.

Further, any method of impregnating the solid oxide material with a metal may be used. The method by which the oxide is contacted with a metal source, typically a salt or metal-containing compound, includes, but is not limited to, gelling, co-gelling, impregnation of one compound onto another, and the like. Following any contacting method, the contacted mixture of oxide compound, electron-withdrawing anion, and the metal ion is typically calcined. Alternatively, a solid oxide material, an electron-withdrawing anion source, and the metal salt or metal-containing compound are contacted and calcined simultaneously.

In another aspect, the metallocene compound may be precontacted with an olefin monomer and an organoaluminum compound for a first period of time prior to contacting this mixture with the chemically-treated solid oxide. Once the precontacted mixture of the metallocene compound, olefin monomer, organoaluminum compound is contacted with the chemically-treated solid oxide, the composition further comprising the chemically-treated solid oxide is termed the "postcontacted" mixture. The postcontacted mixture may be allowed to remain in further contact for a second period of time prior to being charged into the reactor in which the polymerization process will be carried out.

Various processes to prepare solid oxide activator-supports that can be employed in this invention have been reported. For example, U.S. Pat. Nos. 6,107,230, 6,165,929, 6,294,494, 6,300,271, 6,316,553, 6,355,594, 6,376,415, 6,391,816, 6,395,666, 6,524,987, and 6,548,441, describe such methods, each of which is incorporated by reference herein, in its entirety.

The Organoaluminum Compound

In one aspect, this invention encompasses a catalyst composition comprising at least one tightly-bridged metallocene compound, at least one chemically-treated solid oxide, and at least one organoaluminum compound. Organoaluminum compounds that can be used in this invention include, but are not limited to compound with the formula:

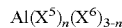

wherein $(X^5)$ is a hydrocarbyl having from 1 to about 20 carbon atoms; $(X^6)$ is selected from alkoxide or aryloxide, any one of which having from 1 to about 20 carbon atoms, halide, or hydride; and n is a number from 1 to 3, inclusive. In one aspect, $(X^5)$ is an alkyl having from 1 to about 10 carbon atoms. Examples of $(X^5)$ moieties include, but are not limited to, ethyl, propyl, n-butyl, sec-butyl, isobutyl, hexyl, and the like. In another aspect, $(X^6)$ may be independently selected from fluoro or chloro. In yet another aspect, $(X^6)$ may be chloro.

In the formula $Al(X^5)_n(X^6)_{3-n}$, n is a number from 1 to 3 inclusive, and typically, n is 3. The value of n is not restricted to be an integer, therefore this formula includes sesquihalide compounds or other organoaluminum cluster compounds.

Generally, examples of organoaluminum compounds that can be used in this invention include, but are not limited to, trialkylaluminum compounds, dialkylaluminium halide compounds, dialkylaluminum alkoxide compounds, dialkylaluminum hydride compounds, and combinations thereof. Specific examples of organoaluminum compounds that are useful in this invention include, but are not limited to: trimethylaluminum (TMA); triethylaluminum (TEA); tripropylaluminum; diethylaluminum ethoxide; tributylaluminum; diisobutylaluminum hydride; triisobutylaluminum; and diethylaluminum chloride.

In one aspect, the present invention comprises precontacting the tightly-bridged ansa-metallocene with at least one organoaluminum compound and an olefin monomer to form a precontacted mixture, prior to contact this precontacted mixture with the solid oxide activator-support to form the active catalyst. When the catalyst composition is prepared in this manner, typically, though not necessarily, a portion of the organoaluminum compound can be added to the precontacted mixture and another portion of the organoaluminum compound is added to the postcontacted mixture prepared when the precontacted mixture is contacted with the solid oxide activator. However, all the organoaluminum compound may be used to prepare the catalyst in either the precontacting or postcontacting step. Alternatively, all the catalyst components may be contacted in a single step.

Further, more than one organoaluminum compounds may be used, in either the precontacting or the postcontacting step. When an organoaluminum compound is added in multiple steps, the amounts of organoaluminum compound disclosed herein include the total amount of organoaluminum compound used in both the precontacted and postcontacted mixtures, and any additional organoaluminum compound added to the polymerization reactor. Therefore, total amounts of organoaluminum compounds are disclosed, regardless of whether a single organoaluminum compound is used, or more than one organoaluminum compound. In another aspect, triethylaluminum (TEA) or triisobutylaluminum are typical organoaluminum compounds used in this invention.

The Optional Aluminoxane Cocatalyst

In one aspect, the present invention provides a method of polymerizing olefins, comprising:

contacting ethylene and at least one olefin comonomer with a catalyst composition under polymerization conditions to form a copolymer;

wherein the catalyst composition comprises the contact product of at least one tightly-bridged ansa metallocene compound, at least one organoaluminum compound, and at least one chemically-treated solid oxide. In another aspect, the catalyst composition can comprise an optional aluminoxane cocatalyst in addition to these other components.

Aluminoxanes are also referred to as poly(hydrocarbyl aluminum oxides) or organoaluminoxanes. The other catalyst components are typically contacted with the aluminoxane in a saturated hydrocarbon compound solvent, though any solvent which is substantially inert to the reactants, intermediates, and products of the activation step can be used. The catalyst composition formed in this manner may be collected by methods known to those of skill in the art, including but not limited to filtration, or the catalyst composition may be introduced into the polymerization reactor without being isolated.

The aluminoxane compound of this invention is an oligomeric aluminum compound, wherein the aluminoxane compound can comprise linear structures, cyclic, or cage structures, or typically mixtures of all three. Cyclic aluminoxane compounds having the formula:

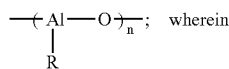; wherein

R is a linear or branched alkyl having from 1 to 10 carbon atoms, and n is an integer from 3 to about 10 are encompassed by this invention. The (AlRO)$_n$ moiety shown here also constitutes the repeating unit in a linear aluminoxane. Thus, linear aluminoxanes having the formula:

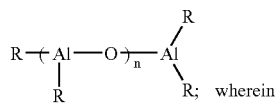; wherein

R is a linear or branched alkyl having from 1 to 10 carbon atoms, and n is an integer from 1 to about 50, are also encompassed by this invention.

Further, aluminoxanes may also have cage structures of the formula $R^t_{5m+\alpha}R^b_{m-\alpha}Al_{4m}O_{3m}$, wherein m is 3 or 4 and $\alpha$ is $=n_{Al(3)}-n_{O(2)}+n_{(4)}$; wherein $n_{Al(3)}$ is the number of three coordinate aluminum atoms, $n_{O(2)}$ is the number of two coordinate oxygen atoms, $n_{O(4)}$ is the number of 4 coordinate oxygen atoms, $R^t$ represents a terminal alkyl group, and $R^b$ represents a bridging alkyl group; wherein R is a linear or branched alkyl having from 1 to 10 carbon atoms.

Thus, aluminoxanes that can serve as optional cocatalysts in this invention are generally represented by formulas such as (R—Al—O)$_n$, R(R—Al—O)$_n$AlR$_2$, and the like, wherein the R group is typically a linear or branched C$_1$–C$_6$ alkyl such as methyl, ethyl, propyl, butyl, pentyl, or hexyl wherein n typically represents an integer from 1 to about 50. In one embodiment, the aluminoxane compounds of this invention include, but are not limited to, methylaluminoxane, ethylaluminoxane, n-propylaluminoxane, iso-propylaluminoxane, n-butylaluminoxane, t-butylaluminoxane, sec-butylaluminoxane, iso-butylaluminoxane, 1-pentylaluminoxane, 2-pentylaluminoxane, 3-pentyl-aluminoxane, iso-pentylaluminoxane, neopentylaluminoxane, or combinations thereof.

While organoaluminoxanes with different types of R groups are encompassed by the present invention, methyl aluminoxane (MAO), ethyl aluminoxane, or isobutyl aluminoxane are typical optional cocatalysts used in the catalyst compositions of this invention. These aluminoxanes are prepared from trimethylaluminum, triethylaluminum, or triisobutylaluminum, respectively, and are sometimes referred to as poly(methyl aluminum oxide), poly(ethyl aluminum oxide), and poly(isobutyl aluminum oxide), respectively. It is also within the scope of the invention to use an aluminoxane in combination with a trialkylaluminum, such as disclosed in U.S. Pat. No. 4,794,096, which is herein incorporated by reference in its entirety.

The present invention contemplates many values of n in the aluminoxane formulas (R—Al—O)$_n$ and R(R—Al—O)$_n$AlR$_2$, and preferably n is at least about 3. However, depending upon how the organoaluminoxane is prepared, stored, and used, the value of n may be variable within a single sample of aluminoxane, and such a combination of organoaluminoxanes are comprised in the methods and compositions of the present invention.

In preparing the catalyst composition of this invention comprising an optional aluminoxane, the molar ratio of the aluminum in the aluminoxane to the metallocene in the composition is usually from about 1:10 to about 100,000:1. In one another aspect, the molar ratio of the aluminum in the aluminoxane to the metallocene in the composition is usually from about 5:1 to about 15,000:1. The amount of optional aluminoxane added to a polymerization zone is an amount within a range of about 0.01 mg/L to about 1000 mg/L, from about 0.1 mg/L to about 100 mg/L, or from about 1 mg/L to abut 50 mg/L.

Organoaluminoxanes can be prepared by various procedures which are well known in the art. Examples of organoaluminoxane preparations are disclosed in U.S. Pat. Nos. 3,242,099 and 4,808,561, each of which is incorporated by reference herein, in its entirety. One example of how an aluminoxane may be prepared is as follows. Water which is dissolved in an inert organic solvent may be reacted with an aluminum alkyl compound such as AlR$_3$ to form the desired organoaluminoxane compound. While not intending to be bound by this statement, it is believed that this synthetic method can afford a mixture of both linear and cyclic (R—Al—O)$_n$ aluminoxane species, both of which are encompassed by this invention. Alternatively, organoaluminoxanes may be prepared by reacting an aluminum alkyl compound such as AlR$_3$ with a hydrated salt, such as hydrated copper sulfate, in an inert organic solvent.

The Optional Organozinc Cocatalysts

In one aspect, the present invention provides a method of polymerizing olefins, comprising:

contacting ethylene and at least one olefin comonomer with a catalyst composition under polymerization conditions to form a copolymer;

wherein the catalyst composition comprises the contact product of at least one tightly-bridged ansa metallocene compound, at least one organoaluminum compound, and at least one chemically-treated solid oxide. In another aspect, the catalyst composition can comprise an optional organozinc cocatalyst in addition to these other components.

In one aspect, the catalyst composition further comprises an optional organozinc cocatalyst, selected from a compound with the following formula:

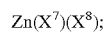

wherein (X$^7$) is a hydrocarbyl having from 1 to about 20 carbon atoms; (X$^8$) is selected from a hydrocarbyl, an alkoxide or an aryloxide having from 1 to about 20 carbon atoms, halide, or hydride. In another aspect, the optional organozinc cocatalyst is selected from dimethylzinc, diethylzinc, dipropylzinc, dibutylzinc, dineopentylzinc, di(trimethylsilylmethyl)zinc, and the like, including any combinations thereof.

The Optional Organoboron Cocatalyst

In one aspect, the present invention provides a method of polymerizing olefins, comprising:

contacting ethylene and at least one olefin comonomer with a catalyst composition under polymerization conditions to form a copolymer;

wherein the catalyst composition comprises the contact product of at least one tightly-bridged ansa metallocene compound, at least one organoaluminum compound, and at least one chemically-treated solid oxide. In another aspect, the catalyst composition can comprise an optional organoboron cocatalyst in addition to these other components.

In one aspect, the organoboron compound comprises neutral boron compounds, borate salts, or combinations thereof. For example, the organoboron compounds of this invention can comprise a fluoroorgano boron compound, a fluoroorgano borate compound, or a combination thereof. Any fluoroorgano boron or fluoroorgano borate compound known in the art can be utilized. The term fluoroorgano boron compounds has its usual meaning to refer to neutral compounds of the form $BY_3$. The term fluoroorgano borate compound also has its usual meaning to refer to the monoanionic salts of a fluoroorgano boron compound of the form [cation]$^+$[$BY_4$]$^-$, where Y represents a fluorinated organic group. For convenience, fluoroorgano boron and fluoroorgano borate compounds are typically referred to collectively by organoboron compounds, or by either name as the context requires.

Examples of fluoroorgano borate compounds that can be used as cocatalysts in the present invention include, but are not limited to, fluorinated aryl borates such as, N,N-dimethylanilinium tetrakis(pentafluorophenyl)borate, triphenylcarbenium tetrakis(pentafluorophenyl)borate, lithium tetrakis-(pentafluorophenyl)borate, N,N-dimethylanilinium tetrakis[3,5-bis(trifluoro-methyl)phenyl]borate, triphenylcarbenium tetrakis[3,5-bis(trifluoromethyl)-phenyl]borate, and the like, including mixtures thereof. Examples of fluoroorgano boron compounds that can be used as cocatalysts in the present invention include, but are not limited to, tris(pentafluorophenyl)boron, tris[3,5-bis(trifluoromethyl)phenyl]boron, and the like, including mixtures thereof.

Although not intending to be bound by the following theory, these examples of fluoroorgano borate and fluoroorgano boron compounds, and related compounds, are thought to form "weakly-coordinating" anions when combined with organometal compounds, as disclosed in U.S. Pat. No. 5,919,983, which is incorporated herein by reference in its entirety.

Generally, any amount of organoboron compound can be utilized in this invention. In one aspect, the molar ratio of the organoboron compound to the metallocene compound in the composition is from about 0.1:1 to about 10:1. Typically, the amount of the fluoroorgano boron or fluoroorgano borate compound used as a cocatalyst for the metallocene is in a range of from about 0.5 mole to about 10 moles of boron compound per mole of metallocene compound. In one aspect, the amount of fluoroorgano boron or fluoroorgano borate compound used as a cocatalyst for the metallocene is in a range of from about 0.8 mole to about 5 moles of boron compound per mole of metallocene compound.

The Optional Ionizing Ionic Compound Cocatalyst

In one aspect, the present invention provides a method of polymerizing olefins, comprising:

contacting ethylene and at least one olefin comonomer with a catalyst composition under polymerization conditions to form a copolymer;

wherein the catalyst composition comprises the contact product of at least one tightly-bridged ansa metallocene compound, at least one organoaluminum compound, and at least one chemically-treated solid oxide. In another aspect, the catalyst composition can comprise an optional ionizing ionic compound cocatalyst in addition to these other components. Examples of ionizing ionic compound are disclosed in U.S. Pat. Nos. 5,576,259 and 5,807,938, each of which is incorporated herein by reference, in its entirety.

An ionizing ionic compound is an ionic compound which can function to enhance the activity of the catalyst composition. While not bound by theory, it is believed that the ionizing ionic compound may be capable of reacting with the metallocene compound and converting the metallocene into a cationic metallocene compounds. Again, while not intending to be bound by theory, it is believed that the ionizing ionic compound may function as an ionizing compound by completely or partially extracting an anionic ligand, possibly a non-$\eta^5$-alkadienyl ligand such as ($X^3$), ($X^4$) from the metallocene. However, the ionizing ionic compound is an activator regardless of whether it is ionizes the metallocene, abstracts an ($X^3$), ($X^4$) ligand in a fashion as to form an ion pair, weakens the metal-($X^3$), metal-($X^4$), bond in the metallocene, simply coordinates to an ($X^3$), ($X^4$)) ligand, or any other mechanisms by which activation may occur.

Further, it is not necessary that the ionizing ionic compound activate the metallocene only. The activation function of the ionizing ionic compound is evident in the enhanced activity of catalyst composition as a whole, as compared to a catalyst composition containing catalyst composition that does not comprise any ionizing ionic compound.

Examples of ionizing ionic compounds include, but are not limited to, the following compounds: tri(n-butyl)ammonium tetrakis(p-tolyl)borate, tri(n-butyl)-ammonium tetrakis (m-tolyl)borate, tri(n-butyl)ammonium tetrakis(2,4-dimethyl)-borate, tri(n-butyl)ammonium tetrakis(3,5-dimethylphenyl)borate, tri(n-butyl)-ammonium tetrakis[3,5-bis(trifluoromethyl)phenyl]borate, tri(n-butyl)ammonium tetrakis(pentafluorophenyl)borate, N,N-dimethylanilinium tetrakis(p-tolyl)borate, N,N-dimethylanilinium tetrakis(m-tolyl)borate, N,N-dimethylanilinium tetrakis(2,4-dimethylphenyl)borate, N,N-dimethylanilinium tetrakis(3,5-dimethyl-phenyl)borate, N,N-dimethylanilinium tetrakis[3,5-bis (trifluoro-methyl)phenyl]borate, N,N-dimethylanilinium tetrakis(pentafluorophenyl)borate, triphenylcarbenium tetrakis(p-tolyl)borate, triphenylcarbenium tetrakis(m-tolyl)borate, triphenylcarbenium tetrakis(2,4-dimethylphenyl)borate, triphenylcarbenium tetrakis(3,5-dimethylphenyl) borate, triphenylcarbenium tetrakis[3,5-bis(trifluoromethyl)phenyl]borate, triphenylcarbenium tetrakis (pentafluorophenyl)borate, tropylium tetrakis(p-tolyl) borate, tropylium tetrakis(m-tolyl)borate, tropylium tetrakis (2,4-dimethylphenyl)borate, tropylium tetrakis(3,5-dimethylphenyl)borate, tropylium tetrakis[3,5-bis(trifluoromethyl)phenyl]borate, tropylium tetrakis (pentafluorophenyl)borate, lithium tetrakis (pentafluorophenyl)borate, lithium tetrakis(phenyl)borate, lithium tetrakis(p-tolyl)borate, lithium tetrakis(m-tolyl)borate, lithium tetrakis(2,4-dimethylphenyl)borate, lithium tetrakis(3,5-dimethylphenyl)borate, lithium tetrafluoroborate, sodium tetrakis(pentafluorophenyl)borate, sodium tetrakis (phenyl)borate, sodium tetrakis(p-tolyl)borate, sodium tetrakis(m-tolyl)borate, sodium tetrakis(2,4-dimethylphenyl) borate, sodium tetrakis(3,5-dimethylphenyl)borate, sodium tetrafluoroborate, potassium tetrakis-(pentafluorophenyl)borate, potassium tetrakis(phenyl)borate, potassium tetrakis(p- tolyl)borate, potassium tetrakis(m-tolyl)borate, potassium tetrakis(2,4-dimethylphenyl)borate, potassium tetrakis(3,5-dimethylphenyl)borate, potassium tetrafluoroborate, tri(n-butyl)ammonium tetrakis(p-tolyl)aluminate, tri(n-butyl)ammonium tetrakis(m-tolyl)aluminate, tri(n-butyl)ammonium tetrakis(2,4-dimethyl)aluminate, tri(n-butyl)ammonium tetrakis(3,5-dimethylphenyl)aluminate, tri(n-butyl)ammonium tetrakis(pentafluorophenyl)-aluminate, N,N-dimethylanilinium tetrakis(p-tolyl)aluminate, N,N-dimethylanilinium tetrakis(m-tolyl)aluminate, N,N-dimethylanilinium tetrakis (2,4-dimethylphenyl)aluminate, N,N-dimethylanilinium tetrakis(3,5-dimethylphenyl)aluminate, N,N-dimethylanilinium tetrakis (pentafluorophenyl)-aluminate, triphenylcarbenium tetrakis(p-tolyl)aluminate, triphenylcarbenium tetrakis(m-tolyl)aluminate, triphenylcarbenium tetrakis(2,4-dimethylphenyl)-aluminate, triphenylcarbenium tetrakis(3,5-dimethylphenyl)aluminate, triphenylcarbenium tetrakis(pentafluorophenyl)aluminate, tropylium tetrakis(p-tolyl)aluminate, tropylium tetrakis(m-tolyl)aluminate, tropylium tetrakis(2,4-dimethylphenyl)aluminate, tropylium tetrakis(3,5-dimethylphenyl)aluminate, tropylium tetrakis (pentafluorophenyl)aluminate, lithium tetrakis-(pentafluorophenyl)aluminate, lithium tetrakis(phenyl)aluminate, lithium tetrakis(p-tolyl)aluminate, lithium tetrakis(m-tolyl) aluminate, lithium tetrakis(2,4-dimethylphenyl)aluminate, lithium tetrakis(3,5-dimethylphenyl)aluminate, lithium tetrafluoroaluminate, sodium tetrakis(pentafluorophenyl)aluminate, sodium tetrakis(phenyl)aluminate, sodium tetrakis (p-tolyl)aluminate, sodium tetrakis(m-tolyl)aluminate, sodium tetrakis(2,4-dimethylphenyl)aluminate, sodium tetrakis(3,5-dimethylphenyl)aluminate, sodium tetrafluoroaluminate, potassium tetrakis(pentafluorophenyl)aluminate, potassium tetrakis(phenyl)aluminate, potassium tetrakis(p-tolyl)aluminate, potassium tetrakis(m-tolyl)aluminate, potassium tetrakis(2,4-dimethylphenyl)aluminate, potassium tetrakis (3,5-dimethylphenyl)aluminate, potassium tetrafluoroaluminate, However, the ionizing ionic compound is not limited thereto in the present invention.

Olefin Monomers

In one aspect, unsaturated reactants that are useful in the polymerization processes with catalyst compositions and processes of this invention typically include olefin compounds having from about 2 to about 30 carbon atoms per molecule and having at least one olefinic double bond. This invention encompasses homopolymerization processes using a single olefin such as ethylene or propylene, as well as copolymerization reactions with at least one different olefinic compound. In one aspect of a copolymerization reaction of ethylene, copolymers of ethylene comprise a major amount of ethylene (>50 mole percent) and a minor amount of comonomer (<50 mole percent), though this is not a requirement. The comonomers that can be copolymerized with ethylene should have from three to about 20 carbon atoms in their molecular chain.

Acyclic, cyclic, polycyclic, terminal ($\alpha$), internal, linear, branched, substituted, unsubstituted, functionalized, and non-functionalized olefins may be employed in this invention. For example, typical unsaturated compounds that may be polymerized with the catalysts of this invention include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes, the four normal nonenes, the five normal decenes, and mixtures of any two or more thereof. Cyclic and bicyclic olefins, including but not limited to, cyclopentene, cyclohexene, norbornylene, norbornadiene, and the like, may also be polymerized as described above.

In one aspect, when a copolymer is desired, the monomer ethylene may be copolymerized with a comonomer. In another aspect, examples of the comonomer include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes, the four normal nonenes, or the five normal decenes. In another aspect, the comonomer may be selected from 1-butene, 1-pentene, 1-hexene, 1-octene, 1-decene, or styrene.

In one aspect, the amount of comonomer introduced into a reactor zone to produce the copolymer is generally from about 0.01 to about 10 weight percent comonomer based on the total weight of the monomer and comonomer. In another aspect, the amount of comonomer introduced into a reactor zone is from about 0.01 to about 5 weight percent comonomer, and in still another aspect, from about 0.1 to about 4 weight percent comonomer based on the total weight of the monomer and comonomer. Alternatively, an amount sufficient to give the above described concentrations by weight, in the copolymer produced can be used.

While not intending to be bound by this theory, in the event that branched, substituted, or functionalized olefins are used as reactants, it is believed that steric hindrance may impede and/or slow the polymerization process. Thus, branched and/or cyclic portion(s) of the olefin removed somewhat from the carbon-carbon double bond would not be expected to hinder the reaction in the way that the same olefin substituents situated more proximate to the carbon-carbon double bond might. In one aspect, at least one reactant for the catalyst compositions of this invention is ethylene, so the polymerizations are either homopolymerizations or copolymerizations with a different acyclic, cyclic, terminal, internal, linear, branched, substituted, or unsubstituted olefin. In addition, the catalyst compositions of this invention may be used in polymerization of diolefin compounds, including but are not limited to, 1,3-butadiene, isoprene, 1,4-pentadiene, and 1,5-hexadiene. In this aspect, for example, the diolefin comonomer can be copolymerized with ethylene.

Preparation of the Catalyst Composition

In one aspect, the present invention provides a method of polymerizing olefins, comprising:

contacting ethylene and at least one olefin comonomer with a catalyst composition under polymerization conditions to form a copolymer;

wherein the catalyst composition comprises the contact product of at least one tightly-bridged ansa metallocene compound, at least one organoaluminum compound, and at least one chemically-treated solid oxide. In another aspect, the catalyst composition can be prepared by a process comprising at least one optional precontacting step, in which all the catalyst components, or any subset of catalyst components, are contacted for a period of time, typically from about 1 minute to about 24 hours, prior to initiating the polymerization reaction. In this aspect, more than one precontact step may be used, with at least one catalyst component being added in each subsequent step. It is also possible to use multiple precontacted mixtures, which are subsequently mixed to provide the mixture comprising all the catalyst components to be employed for that reaction, and termed the postcontacted mixture.

Also in this aspect, any combination of catalyst components can be used in any of the optional precontacting steps used to prepare the catalyst composition. Further, once all the catalyst components are contacted, a postcontacting time in which all these components remain in contact can optionally be employed, typically from about 1 minute to about 24 hours, prior to initiating the polymerization reaction.

In one aspect of this invention, at least one tightly-bridged ansa metallocene can optionally be precontacted with an olefinic monomer, not necessarily the olefin monomer to be polymerized, and an organoaluminum cocatalyst for a first period of time prior to contacting this precontacted mixture with the chemically treated solid oxide. In one aspect, the first precontact period of time for contact between the metallocene compound or compounds, the olefinic monomer, and the organoaluminum compound can typically range from about 0.1 hour to about 24 hours, and in another aspect from about 0.1 to about 1 hour is typical.

Any of the precontacting steps can optionally be carried out in the presence of one of the olefin monomers to be polymerized, or in the presence of another olefin. Generally, this contacting step is carried out continuously and just prior to introduction into the reactor. The process of preparing the catalyst of this invention typically occurs in an inert atmosphere and under substantially anhydrous conditions, that is the atmosphere is substantially oxygen-free and free of water as the reaction begins, to prevent deactivatation of the catalyst. For example, one aspect of this invention comprises contacting a bridged metallocene compound, such as rac-ethylenebis(indenyl)zirconium dichloride or dimethylsilyl bis(indenyl)zirconium dichloride catalyst, with an organoaluminum compound such as triethylaluminum, and a fluorided metal oxide chemically-treated solid oxide such as flourided silica-alumina.

The contacting step may be carried out in a variety of ways, including but not limited to, blending. Furthermore, each of the tightly-bridged metallocene compound, organoaluminum compound, and chemically-treated solid oxide activator can be fed into a reactor separately, or various combinations of these compounds can be contacted with each other before being further contacted in the reactor. Alternatively, all three compounds can be contacted together before being introduced into the reactor or at the same time they are being introduced in to the reactor. This contacting step is usually carried out under an inert atmosphere. Further, the contacting step may be carried out with stirring, agitation, heating, cooling, sonication, shaking, under pressure, at room temperature, in an inert solvent (typically a hydrocarbon), and the like.

In another aspect of the invention, the components of the catalyst composition can be fed to the reactor, including precontacting steps if desired, in a controlled and continuous manner. This method allows the catalyst compostion to be adjusted during the polymerization process itself, allowing for tailoring of the polymer as it is produced.

In yet another aspect of this invention, once the precontacted mixture of the at least one metallocene compound, optional olefin monomer, and organoaluminum compound is contacted with the chemically treated solid oxide, this composition further comprising the chemically treated solid oxide is termed the postcontacted mixture. Typically, the postcontacted mixture may optionally be allowed to remain in contact for another period of time, the postcontact time, prior to initiating the polymerization process. In this aspect, postcontact times in which all the catalyst components to be used in a reaction are in contact, may range in time from about 0.1 hour to about 24 hours. In another aspect, for example, postcontact times from about 0.1 hour to about 1 hour are typical.

For example, in one aspect, a catalyst composition of this invention is prepared by contacting rac-ethylenebis(indenyl)zirconium dichloride with triethylaluminum and fluorided silica-alumina for a period of at least about 5 minutes to about 1 hour, prior to initiating the polymerization of ethylene and 1-hexene.

In another aspect, the precontacting step or steps, the postcontacting step, or each of these may increase the productivity of the polymer as compared to the same catalyst composition that is prepared without precontacting or postcontacting for any substantial period of time. However, neither a precontacting step nor a postcontacting step are required for this invention.

The postcontacted mixture may be heated at a temperature and for a duration sufficient to allow adsorption, impregnation, or interaction of precontacted mixture and the chemically treated solid oxide, such that a portion of the components of the precontacted mixture is immobilized, adsorbed, or deposited thereon. For example, the postcontacted mixture may be heated from between about 0° F. to about 250° F. Temperatures between about 40° F. to about 95° F. are typical if the mixture is heated at all. For example, in one aspect, a catalyst composition of this invention is prepared by contacting rac-ethylenebis(indenyl)zirconium dichloride with triethylaluminum and fluorided silica-alumina for a period of at least about 5 minutes to about 2 hours, prior to initiating the polymerization of ethylene and 1-hexene.

In yet another aspect, the molar ratio of the total moles of the at least one metallocene compound combined to the total moles of the at least one organoaluminum compound may be from about 1:1 to about 1:10,000. In another aspect, the molar ratio of the moles of metallocene compound to the organoaluminum compound may be from about 1:1 to about 1:1,000, and in another aspect, from about 1:1 to about 1:100. When applicable, these molar ratios reflect the ratio of the total moles more than one of metallocene compound combined to the total amount of organoaluminum compound in both the precontacted mixture and the postcontacted mixture combined.

When a precontacting step is used that involves at least one metallocene and at least one olefin, generally the molar ratio of total olefin monomer to total moles of metallocene combined in the precontacted mixture may be from about 1:10 to about 100,000:1, or from about 10:1 to about 1,000:1.

In another aspect of this invention, the weight ratio of the chemically treated solid oxide to the organoaluminum compound may range from about 1:5 to about 1,000:1. In another aspect, the weight ratio of the chemically treated solid oxide to the organoaluminum compound may be from about 1:3 to about 100:1, and in yet another aspect, from about 1:1 to about 50:1.

One aspect of this invention is that aluminoxane is not required to form the catalyst composition disclosed herein, a feature that allows lower polymer production costs. Accordingly, in one aspect, the present invention can use $AlR_3$-type organoaluminum compounds and a chemically treated solid oxide in the absence of aluminoxanes. While not intending to be bound by theory, it is believed that the organoaluminum compounds likely does not activate the metallocene catalyst in the same manner as an organoaluminoxane.

Additionally, no expensive borate compounds or $MgCl_2$ are required to form the catalyst composition of this invention, although aluminoxanes, organoboron compounds, ionizing ionic compounds, organozinc compounds, $MgCl_2$, or any combination thereof can optionally be used in the catalyst composition of this invention. Further, in one aspect, cocatalysts such as aluminoxanes, organoboron compounds, ionizing ionic compounds, organozinc compounds, or any combination thereof may be used as cocatalysts with the metallocene compound, either in the presence or in the absence of the chemically treated solid oxide, and either in the presence or in the absence of the organoaluminum compounds.

In one aspect, the catalyst activity of the catalyst of this invention is typically greater than or equal to about 100 grams polyethylene per gram of chemically treated solid oxide per hour (abbreviated gP/(gCTSO·hr)). In another aspect, the catalyst of this invention may be characterized by an activity of greater than or equal to about 250 gP/(gCTSO·hr), and in another aspect, an activity of greater than or equal to about 500 gP/(gCTSO·hr). In still another aspect, the catalyst of this invention may be characterized by an activity of greater than or equal to about 1000 gP/(gCTSO·hr), and in another aspect, an activity of greater than or equal to about 2000 gP/(gCTSO·hr). This activity is measured under slurry polymerization conditions, using isobutane as the diluent, and with a polymerization temperature of about 90° C., and an ethylene pressure of about 550 psig. The reactor should have substantially no indication of any wall scale, coating or other forms of fouling upon making these measurements.

Utility of the Catalyst Composition in Polymerization Processes

The Examples and Tables disclosed herein provide some non-limiting examples of catalysts and preparative conditions for the catalysts of the present invention, as well as the properties of the resulting resin and films prepared therefrom. Polymerizations using the catalysts of this invention can be carried out in any manner known in the art. Such polymerization processes include, but are not limited to slurry polymerizations, gas phase polymerizations, solution polymerizations, and the like, including multi-reactor combinations thereof. Thus, any polymerization zone known in the art to produce ethylene-containing polymers can be utilized. For example, a stirred reactor can be utilized for a batch process, or the reaction can be carried out continuously in a loop reactor or in a continuous stirred reactor.

After catalyst preparation and activation, a catalyst composition is used to homopolymerize ethylene, or copolymerize ethylene with a comonomer. A typical polymerization method is a slurry polymerization process (also known as the particle form process), which is well known in the art and is disclosed, for example in U.S. Pat. No. 3,248,179, which is incorporated by reference herein, in its entirety. Other polymerization methods of the present invention are those utilizing a plurality of stirred reactors either in series, parallel, or combinations thereof, wherein the reaction conditions are different in the different reactors.

Polymerization temperature for this invention typically ranges from about 60° C. to about 280° C., with a polymerization reaction temperature more typically operating between about 70° C. to about 110° C.

The polymerization reaction typically occurs in an inert atmosphere, that is, in atmosphere substantial free of oxygen and under substantially anhydrous conditions, thus, in the absence of water as the reaction begins. Therefore a dry, inert atmosphere, for example, dry nitrogen or dry argon, is typically employed in the polymerization reactor.

The polymerization reaction pressure can be any pressure that does not adversely affect the polymerization reaction, and it typically conducted at a pressure higher than the pretreatment pressures. Generally, polymerization pressures are from about atmospheric pressure to about 1000 psig, more typically from about 50 psig to about 800 psig. Further, hydrogen can be used in the polymerization process of this invention to control polymer molecular weight.

Polymerizations using the catalysts of this invention can be carried out in any manner known in the art. Such processes that can polymerize monomers into polymers include, but are not limited to slurry polymerizations, gas phase polymerizations, solution polymerizations, and multi-reactor combinations thereof. Thus, any polymerization zone known in the art to produce olefin-containing polymers can be utilized. For example, a stirred reactor can be utilized for a batch process, or the reaction can be carried out continuously in a loop reactor or in a continuous stirred reactor. Typically, the polymerizations disclosed herein are carried out using a slurry polymerization process in a loop reaction zone. Suitable diluents used in slurry polymerization are well known in the art and include hydrocarbons which are liquid under reaction conditions. The term "diluent" as used in this disclosure does not necessarily mean an inert material, as this term is meant to include compounds and compositions that may contribute to polymerization process. Examples of hydrocarbons that can be used as diluents include, but are not limited to, cyclohexane, isobutane, n-butane, propane, n-pentane, isopentane, neopentane, and n-hexane. Typically, isobutane is used as the diluent in a slurry polymerization. Examples of this technology are found in U.S. Pat. Nos. 4,424,341; 4,501,885; 4,613,484; 4,737,280; and 5,597,892; each of which is incorporated by reference herein, in its entirety.

For purposes of the invention, the term polymerization reactor includes any polymerization reactor or polymerization reactor system known in the art that is capable of polymerizing olefin monomers to produce homopolymers or copolymers of the present invention. Such reactors can comprise slurry reactors, gas-phase reactors, solution reactors, or any combination thereof. Gas phase reactors can comprise fluidized bed reactors or tubular reactors. Slurry reactors can comprise vertical loops or horizontal loops. Solution reactors can comprise stirred tank or autoclave reactors.

Polymerization reactors suitable for the present invention can comprise at least one raw material feed system, at least one feed system for catalyst or catalyst components, at least one reactor system, at least one polymer recovery system or any suitable combination thereof. Suitable reactors for the present invention can further comprise any one, or combination of, a catalyst storage system, an extrusion system, a cooling system, a diluent recycling system, or a control system. Such reactors can comprise continuous take-off and direct recycling of catalyst, diluent, and polymer. Generally, continuous processes can comprise the continuous introduction of a monomer, a catalyst, and a diluent into a polymerization reactor and the continuous removal from this reactor of a suspension comprising polymer particles and the diluent.

Polymerization reactor systems of the present invention can comprise one type of reactor per system or multiple reactor systems comprising two or more types of reactors operated in parallel or in series. Multiple reactor systems can comprise reactors connected together to perform polymerization, or reactors that are not connected. The polymer can be polymerized in one reactor under one set of conditions, and then the polymer can be transferred to a second reactor for polymerization under a different set of conditions.

In one aspect of the invention, the polymerization reactor system can comprise at least one loop slurry reactor. Such reactors are known in the art and can comprise vertical or horizontal loops. Such loops can comprise a single loop or a series of loops. Multiple loop reactors can comprise both vertical and horizontal loops. The slurry polymerization can be performed in an organic solvent that can disperse the catalyst and polymer. Examples of suitable solvents include butane, hexane, cyclohexane, octane, and isobutane. Monomer, solvent, catalyst and any comonomer are continuously fed to a loop reactor where polymerization occurs. Polymerization can occur at low temperatures and pressures. Reactor effluent can be flashed to remove the solid resin.

In yet another aspect of this invention, the polymerization reactor can comprise at least one gas phase reactor. Such systems can employ a continuous recycle stream containing one or more monomers continuously cycled through the fluidized bed in the presence of the catalyst under polymerization conditions. The recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone.

In still another aspect of the invention, the polymerization reactor can comprise a tubular reactor. Tubular reactors can make polymers by free radical initiation, or by employing the catalysts typically used for coordination polymerization. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams are intermixed for polymerization. Heat and pressure can be employed appropriately to obtain optimal polymerization reaction conditions.

In another aspect of the invention, the polymerization reactor can comprise a solution polymerization reactor. During solution polymerization, the monomer is contacted with the catalyst composition by suitable stirring or other means. A carrier comprising an inert organic diluent or excess monomer can be employed. If desired, the monomer can be brought in the vapor phase into contact with the catalytic reaction product, in the presence or absence of liquid material. The polymerization zone is maintained at temperatures and pressures that will result in the formation of a solution of the polymer in a reaction medium. Agitation can be employed during polymerization to obtain better temperature control and to maintain uniform polymerization mixtures throughout the polymerization zone. Adequate means are utilized for dissipating the exothermic heat of polymerization. The polymerization can be effected in a batch manner, or in a continuous manner. The reactor can comprise a series of at least one separator that employs high pressure and low pressure to separate the desired polymer.

In a further aspect of the invention, the polymerization reactor system can comprise the combination of two or more reactors. Production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactors. Alternatively, polymerization in multiple reactors can include the manual transfer of polymer from one reactor to subsequent reactors for continued polymerization. Such reactors can include any combination including, but not limited to, multiple loop reactors, multiple gas reactors, a combination of loop and gas reactors, a combination of autoclave reactors or solution reactors with gas or loop reactors, multiple solution reactors, or multiple autoclave reactors.

After the polymers are produced, they can be formed into various articles, including but not limited to, household containers, utensils, film products, drums, fuel tanks, pipes, geomembranes, and liners. Various processes can form these articles. Usually, additives and modifiers are added to the polymer in order to provide desired effects. By using the invention described herein, articles can likely be produced at a lower cost, while maintaining most or all of the unique properties of polymers produced with metallocene catalysts.

Polymer Resins and Films

In one aspect, the ethylene homopolymer and copolymer resins prepared according to this invention, and films comprising these resins, can exhibit a combination of properties, including clarity and haze, that allow these materials to be tailored to specific end uses. In this aspect, for example, these materials may be examined alongside conventional linear low-density polyethylene (LLDPE) resins and films, where the properties can be compared and contrasted.

In this aspect, the inventive polymers prepared according to this invention can generally be characterized as having a broad molecular weight distribution as compared to other commercial polymers formed from metallocene-containing catalysts. The polymers prepared according to this invention can also exhibit a high melt strength, low coefficient of friction and high zero shear values, as compared to other polymers formed from metallocene-containing catalysts or conventional LLDPE resins and films. Further, film blown from the inventive polymers can be characterized by high haze values and low clarity.

Conventional LLDPE and ethylene-α-olefin copolymer resins for blown or cast film applications are typically prepared by Ziegler-Natta catalysts or metallocene-based catalysts. These conventional LLDPE resins are characterized by polymer properties that typically fall into these ranges: density from about 0.880–0.940 g/cm$^3$, although higher density polymers (up to about 0.97 g/cm$^3$) are also made with decreasing amounts of α-olefin comonomer; melt index of about 0.5–3 dg/min; polydispersity index ($M_w/M_n$) of about 2.2–5; zero shear viscosity, $\eta_0$, at 190° C. from about 1.0×10$^3$ to about 5.0×10$^4$ Pa·s. When resins such as these are processed in to 25 μm (1 mil or 0.001 inch) blown films using standard linear-low density blown film processing conditions, also know as "no stalk" or "in-pocket" bubble, which are well known to one of ordinary skill in the art, the films generally exhibit the following properties: film haze (25 μm) of 5–20%; film clarity (25 μm) of 80–99.5%; coefficient of friction (COF) characterized by Static/Kinetic of greater than or equal to about 1.0/0.7, respectively, measured in the absence of slip or antiblocking agents; and a melt strength generally described as being low or poor as compared, for example, to high-pressure LDPE resins.

In one aspect, the present invention provides homopolymers and copolymers of ethylene having properties comparable in some aspects to those of conventional LLDPE resins, but have far higher optical opacity, that is, higher haze and lower clarity than conventional LLDPE resins. In this aspect, the ethylene homopolymers and copolymers of the present invention can be characterized, for example, by the following properties: a density of about 0.880–0.970 g/cm$^3$; a melt index of about 0.01–30 dg/min; a polydispersity index ($M_w/M_n$) of about 3–50; a film haze (25 µm) of greater than or equal to about 60%; a film clarity (25 µm) of less than or equal to about 30%; a coefficient of friction (COF) of less than about 0.55 measured in the absence of slip or antiblocking agents; and a melt strength at about 1 mil (as defined herein) of greater than or equal to about 5.0 in. As used herein, the recited coefficient of friction (COF) values are measured in the absence of any slip or antiblocking agents typically used in the industry to lower COF, as disclosed for example in U.S. Pat. Nos. 4,851,478 and 4,594,211, which are incorporated herein by reference.

In another aspect, the present invention provides ethylene polymers and copolymers characterized, for example, by the following properties: melt index (MI) from about 0.01 to about 10 dg/min; high load melt index (HLMI) from about 8 to about 180 dg/min; polydispersity index (Mw/Mn) less than or equal to about 20; film clarity of a 1 mil film less than or equal to about 30%; and film haze of a 1 mil film at least about 60%. In another aspect, the ethylene polymers and copolymers prepared according to this invention can be further characterized, for example, by a density less than about 0.935 g/cm$^3$, or by a melt strength of a 1 mil film greater than or equal to about 5.0 in.

In still another aspect, the present invention provides ethylene polymers and copolymers characterized, for example, by the following properties: melt index (MI) from about 0.03 to about 7 dg/min; high load melt index (HLMI) from about 10 to about 150 dg/min; polydispersity index (Mw/Mn) less than or equal to about 12; film clarity of a 1 mil film less than or equal to about 20%; and film haze of a 1 mil film at least about 70%. In another aspect, the ethylene polymers and copolymers prepared according to this invention can be further characterized, for example, by a density from about 0.880 to about 0.935 g/cm$^3$, or by a melt strength of a 1 mil film greater than or equal to about 5.0 in.

In yet another aspect, the present invention provides ethylene polymers and copolymers characterized, for example, by the following properties: melt index (MI) from about 0.05 to about 5 dg/min; high load melt index (HLMI) from about 11 to about 100 dg/min; polydispersity index (Mw/Mn) less than or equal to about 10, and in another aspect, less than or equal to about 6; film clarity of a 1 mil film less than or equal to about 10%; and film haze of a 1 mil film at least about 80%, and in another aspect, at least about 90%. In another aspect, the ethylene polymers and copolymers prepared according to this invention can be further characterized, for example, by a density from about 0.915 to about 0.930 g/cm$^3$.

In still another aspect, the ethylene/α-olefin copolymers of this invention can be prepared by contacting a tightly-bridged ansa metallocene compound, an organoaluminum compound, and a chemically-treated solid oxide, such as a fluorided alumina or fluorided silica-alumina, with ethylene or with a mixture of ethylene and an α-olefin comonomer having, for example, from 3 to about 12 carbon atoms, under polymerization conditions. As compared to other metallocene-produced polymer films having the similar densities and melt indices as the polymers disclosed herein, the films of this invention exhibit properties, including, but not limited to, the following properties. Not that properties 1–3 may apply to both homopolymers and copolymers. However, property 4 is dependent on density with low stiffness being a consequence of low density. Therefore, the 1% MD Secant Modulus of 50,000 psi will not apply to homopolymers or resins of density greater than about 0.945 g/cc.

1. Antiblocking properties. In one aspect, due to the low coefficient of friction of the films of this invention, these films can tend to block less than conventional LLDPE films or conventional ethylene-α-olefin copolymer films. In this aspect, the polyethylene and ethylene-α-olefin copolymer films of this invention can require lower levels of antiblocking agents, or potentially none at all, depending upon the specific process conditions. This feature of the present invention allows films with the desired properties to be obtained at lower cost than has previously been possible.

2. High Opacity. High opacity in LLDPE packaging films is traditionally achieved by adding coloring agents, fillers, or opacifying agents such as titania or other metal oxides, to the film. In one aspect of the present invention, the polyethylene and ethylene-α-olefin copolymer films of this invention can achieve high opacity without the need for coloring agents or fillers, or upon adding relatively low amounts of coloring agents or fillers.

3. Film Gauge Independence. Typically, in conventional LLDPE films or conventional ethylene-α-olefin copolymer films, as film gauge decreases, haze and optical opacity decreases and clarity increase, resulting from the decrease in path length for light that passes through the film. In another aspect of the present invention, the haze and optical opacity of the ethylene homopolymer and copolymer films of this invention remain substantially constant as film gauge decreases, over a range of useful film thickness.

4. Low Stiffness. Typically, in conventional LLDPE films or conventional ethylene-α-olefin copolymer films, relatively high density and high molecular weight polymers are required to achieve a high optical opacity. In still another aspect of this invention, the ethylene homopolymer and copolymer films of the present invention are able to achieve high opacity levels at lower densities than conventional films. As a result, even the highly opaque films of this invention are characterized by a soft, "cloth-like" feel. In this aspect, for example, films prepared from polymers of density less than about 0.930 g/cm$^3$ of the present invention can be characterized by a 1% MD Secant modulus of less than about 50,000 psi. This combination of low stiffness and high haze imparts to such films the cloth-like feel that renders these films useful in numerous applications such as diaper backings, feminine hygiene products, and the like.

In another aspect of this invention, a LLDPE resin formed in a loop slurry pilot plant, using rac-ethylenebis(indenyl) zirconium dichloride or dimethylsilyl bis(indenyl)zirconium dichloride catalyst, triethylaluminum cocatalyst, and a fluorided alumina or silica-alumina chemically-treated solid oxide, is characterized by the following properties: low density of about 0.915–0.930 g/cm$^3$; high optical opacity (haze>80% and clarity<15%); low static/kinetic coefficient of friction (COF less than about 0.55); optical opacity independent of gauge (blown film haze measured on 0.5–1 mil films is substantially constant); and low stiffness (1% MD Secant modulus of less than about 50,000 psi). In this aspect, the term substantially constant is used herein to indicate that the film haze of a 0.5 mil film is within about 10% of the haze value of the same film measured at 1 mil. In another aspect of this invention, ethylene-1-hexene copolymer resins formed in a loop slurry pilot plant, using similar catalyst and polymerization conditions, are typically characterized by similar properties.

As used herein, the term "polymer" is generally used to refer to either homopolymers or copolymers, therefore in this aspect, for example, the term "polymer of ethylene" can be used to refer to a homopolymer of ethylene, or refer to a copolymer of ethylene and another olefinic comonomer.

Accordingly, in one aspect, the present invention provides a polymer or copolymer of ethylene having a polydispersity index (Mw/Mn) less than or equal to about 20, and a film clarity of a 1 mil film less than or equal to about 30%; a polydispersity index less than or equal to about 12, and the film clarity of a 1 mil film less than or equal to about 20%; or a polydispersity index less than or equal to about 10, and a film clarity of a 1 mil film less than or equal to about 10%. In this aspect, these polymers can typically be further characterized by a density less than about 0.935 g/cm$^3$; a melt index (MI) from about 0.01 to about 10 dg/min; a high load melt index (HLMI) from about 8 to about 180 dg/min; a film haze of a 1 mil film at least about 60%; a melt strength of a 1 mil film greater than or equal to about 5.0 in; a coefficient of friction less than about 0.55; and a substantially constant film haze measured at a film thickness from about 0.5 mil to about 1 mil.

In another aspect, this invention provides a polymer or copolymer of ethylene having a melt index (MI) from about 0.01 to about 10 dg/min, and a film clarity of a 1 mil film less than or equal to about 30%; a melt index from about 0.03 to about 7 dg/min, and a film clarity of a 1 mil film less than or equal to about 20%; or a melt index from about 0.05 to about 5 dg/min, and a film clarity of a 1 mil film less than or equal to about 10%. In this aspect, these polymers can typically be further characterized by a density less than about 0.935 g/cm$^3$; a film haze of a 1 mil film at least about 60%; a melt strength of a 1 mil film greater than or equal to about 5.0 in; and a substantially constant film haze measured at a film thickness from about 0.5 mil to about 1 mil.

In yet another aspect, the present invention provides a polymer or copolymer of ethylene having a high load melt index (HLMI) from about 8 to about 180 dg/min, and a film clarity of a 1 mil film less than or equal to about 30%; a high load melt index (HLMI) from about 10 to about 150 dg/min, and a film clarity of a 1 mil film less than or equal to about 20%; or a high load melt index (HLMI) from about 11 to about 100 dg/min, and a film clarity of a 1 mil film less than or equal to about 10%. In this aspect, these polymers can typically be further characterized by a density less than about 0.935 g/cm$^3$; a film haze of a 1 mil film at least about 60%; a melt strength of a 1 mil film greater than or equal to about 5.0 in; and a substantially constant film haze measured at a film thickness from about 0.5 mil to about 1 mil.

In still another aspect, this invention provides a polymer or copolymer of ethylene having a film haze of a 1 mil film at least about 60%, and a high load melt index (HLMI) from about 8 to about 180 dg/min; a film haze of a 1 mil film of at least about 70%, and high load melt index from about 10 to about 150 dg/min; or a film haze of a 1 mil film of at least about 80%, and the high load melt index from about 11 to about 100 dg/min. In this aspect, these polymers can typically be further characterized by a polydispersity index (Mw/Mn) less than or equal to about 20; a density less than about 0.935 g/cm$^3$; a melt index (MI) from about 0.01 to about 10 dg/min; and a melt strength of a 1 mil film greater than or equal to about 5.0 in. In another aspect, the film of this invention can be further characterized by a substantially constant film haze measured at a film thickness from about 0.5 mil to about 1 mil.

The present invention also provides a film comprising the these polymers disclosed; a molded product comprising these polymers; including, but not limited to, films, sheets, fibers, extrusion molded products, injection molded products, expansion molded products, blow molded products, and the like. In this aspect, the molded product can be a multilayer product comprising more than one layer of the polymer.

In another aspect, the present invention provides a method of polymerizing olefins, comprising:

contacting ethylene and at least one olefin comonomer with a catalyst composition under polymerization conditions to form a copolymer;

wherein the catalyst composition comprises the contact product of at least one tightly-bridged metallocene compound, at least one organoaluminum compound, and at least one chemically-treated solid oxide;

wherein the copolymer has a polydispersity index (Mw/Mn) less than or equal to about 20; and wherein the copolymer has a film clarity of a 1 mil film less than or equal to about 30%.

In this aspect, the copolymer of this invention can also be characterized by a polydispersity index less than or equal to about 12, and the film clarity less than or equal to about 20%; or a polydispersity index less than or equal to about 10, and a film clarity less than or equal to about 10%. Also in this aspect, the copolymer of this invention can typically be further characterized by a density less than about 0.935 g/cm$^3$; a melt index (MI) from about 0.01 to about 10 dg/min; a high load melt index (HLMI) from about 8 to about 180 dg/min; a film haze of a 1 mil film at least about 60%; a melt strength of a 1 mil film greater than or equal to about 5.0 in; and a 1% MD Secant modulus of less than about 50,000 psi.

In still another aspect, this invention provides a method of polymerizing olefins, comprising:

contacting ethylene and at least one olefin comonomer with a catalyst composition under polymerization conditions to form a copolymer;

wherein the catalyst composition comprises the contact product of at least one tightly-bridged metallocene compound, at least one organoaluminum compound, and at least one chemically-treated solid oxide;

wherein the copolymer has a film haze of a 1 mil film at least about 60%; and wherein the copolymer has a high load melt index (HLMI) from about 8 to about 180 dg/min. In this aspect, the copolymer of this invention can also be characterized by a film haze of a 1 mil film of at least about 70%, and high load melt index from about 10 to about 150 dg/min; or a film haze of a 1 mil film of at least about 80%, and the high load melt index from about 11 to about 100 dg/min. Also in this aspect, the copolymer of this invention can typically be further characterized by a polydispersity index (Mw/Mn) less than or equal to about 20; a density less than about 0.935 g/cm$^3$; a melt index (MI) from about 0.01 to about 10 dg/min; a melt strength of a 1 mil film greater than or equal to about 5.0 in; a 1% MD Secant modulus of less than about 50,000 psi.

Accordingly, in one aspect, the polyethylene and ethylene-1-hexene copolymer formed according to the present invention exhibit a combination of properties that can be different to those of other metallocene-produced polymers having substantially similar density and melt index characteristics. The inventive polymers are characterized as having a broad molecular weight distribution as compared to other metallocene polymers. Film blown or cast from the inventive polymers has unusually high haze values and low clarity. Further, the polymers of this invention also exhibit a high melt strength, low coefficient of friction and high zero shear values.

Accordingly, in one aspect, the present invention provides a polymer or copolymer of ethylene having a polydispersity index (Mw/Mn) less than or equal to about 20; less than or equal to about 12; less than or equal to about 10; or less than or equal to about 6.

In another aspect, the present invention provides a polymer of ethylene having a film clarity of a 1 mil film less than or equal to about 30%, less than or equal to about 20%, or less than or equal to about 10%.

In yet another aspect, the present invention provides a polymer of ethylene having a film haze of a 1 mil film at least about 60%, a film haze of a 1 mil film at least about 70%, a film haze of a 1 mil film at least about 80%, or a film haze of a 1 mil film at least about 90%.

Yet still another aspect of this invention is a polymer of ethylene having a melt index (MI) from about 0.01 to about 10 dg/min, a melt index (MI) from about 0.03 to about 7 dg/min, or a melt index (MI) from about 0.05 to about 5 dg/min.

Another aspect of this invention is a polymer of ethylene having a high load melt index (HLMI) from about 8 to about 180 dg/min, a high load melt index (HLMI) from about 10 to about 150 dg/min, or a high load melt index (HLMI) from about 11 to about 100 dg/min.

In another aspect, the present invention provides a polymer of ethylene having a density from about 0.880 to about 0.935 g/cm$^3$, a density from about 0.910 to about 0.935 g/cm$^3$, or a density from about 0.915 to about 0.930 g/cm$^3$.

In still another aspect, this invention provides a polymer of ethylene having a melt strength of a 1 mil film greater than or equal to about 5.0 in, a melt strength of a 1 mil film greater than or equal to about 5.15 in, or a melt strength of a 1 mil film greater than or equal to about 5.25 in.

In yet another aspect, the present invention provides a polymer of ethylene having a static coefficient of friction less than about 0.55, a static coefficient of friction less than about 0.53, or a static coefficient of friction less than about 0.51.

In another aspect, the present invention provides a polymer of ethylene having a substantially constant film haze measured at a film thickness from about 0.5 mil to about 1 mil, wherein the haze of the 0.5 mil film is within about 10% of the haze value measured for the 1 mil film.

In yet another aspect, this invention provides a polymer of ethylene having a 1% MD Secant modulus of less than about 50,000 psi, a 1% MD Secant modulus of less than about 45,000 psi, or a 1% MD Secant modulus of less than about 40,000 psi.

Rheological and Opacity (Haze and Clarity) Properties of the Polymer Resins and Films In one aspect, the resins of the present invention can be characterized by a recoverable shear strain parameter, $\gamma_\infty$, estimated at low frequency (0.03 s$^{-1}$), from about 0.100 to about 1.000, that is, recoverable shear strain $\gamma_\infty \times 1000 = \gamma_\infty \times 1E3 =$ about 100 to about 1000. In another aspect, the recoverable shear strain parameter of resins of the present invention, $\gamma_\infty$, can be from about 100 to about 900, and in another aspect, $\gamma_\infty$ can be from about 150 to about 600. (See: G. L. Wilkes, M. B. Johnson, A. M. Sukhadia, and D. C. Rohlfing; SPE *ANTEC* Conference Proceedings, 2001, 1385–1390; Sukhadia, D. C. Rohlfing, M. B. Johnson, and G. L. Wilkes; SPE *ANTEC* Conference Proceedings, 2001, 1391–1396; each of which is incorporated by reference herein, in its entirety.)

In yet another aspect, this invention provides resins wherein the total haze (H) of 25 μm (1 mil) blown films prepared from the resins of this invention can typically range from H of about 40% to about 99%. Further in this aspect, the H values of 25 μm (1 mil) blown films prepared according to this invention range can be from H of about 60% to about 97%, and in another aspect, H can range from about 70% to about 95%.

Also in accordance with another aspect of this invention, the percent clarity (C or % C) of 25 μm (1 mil) blown films prepared from the resins of this invention can typically range from about 1% to about 40%. In another aspect, the C values of 25 μm (1 mil) blown films prepared according to this invention range from about 1% to about 35%, and in yet another aspect, from about 3% to about 25%.

While not intending to be bound by the following statement, it is believed that the observed behavior of the polymer and the films blown or extruded from the inventive polymer results in part from the high levels of long-chain branching in the high molecular weight fraction of the polymer. In one aspect, the extent of long-chain branching in the polymer is usually higher than that observed in typical chromium oxide catalyst resins, but not as high as conventional HP-LDPE (high-pressure-low density polyethylene) polymers.

Figure 2:
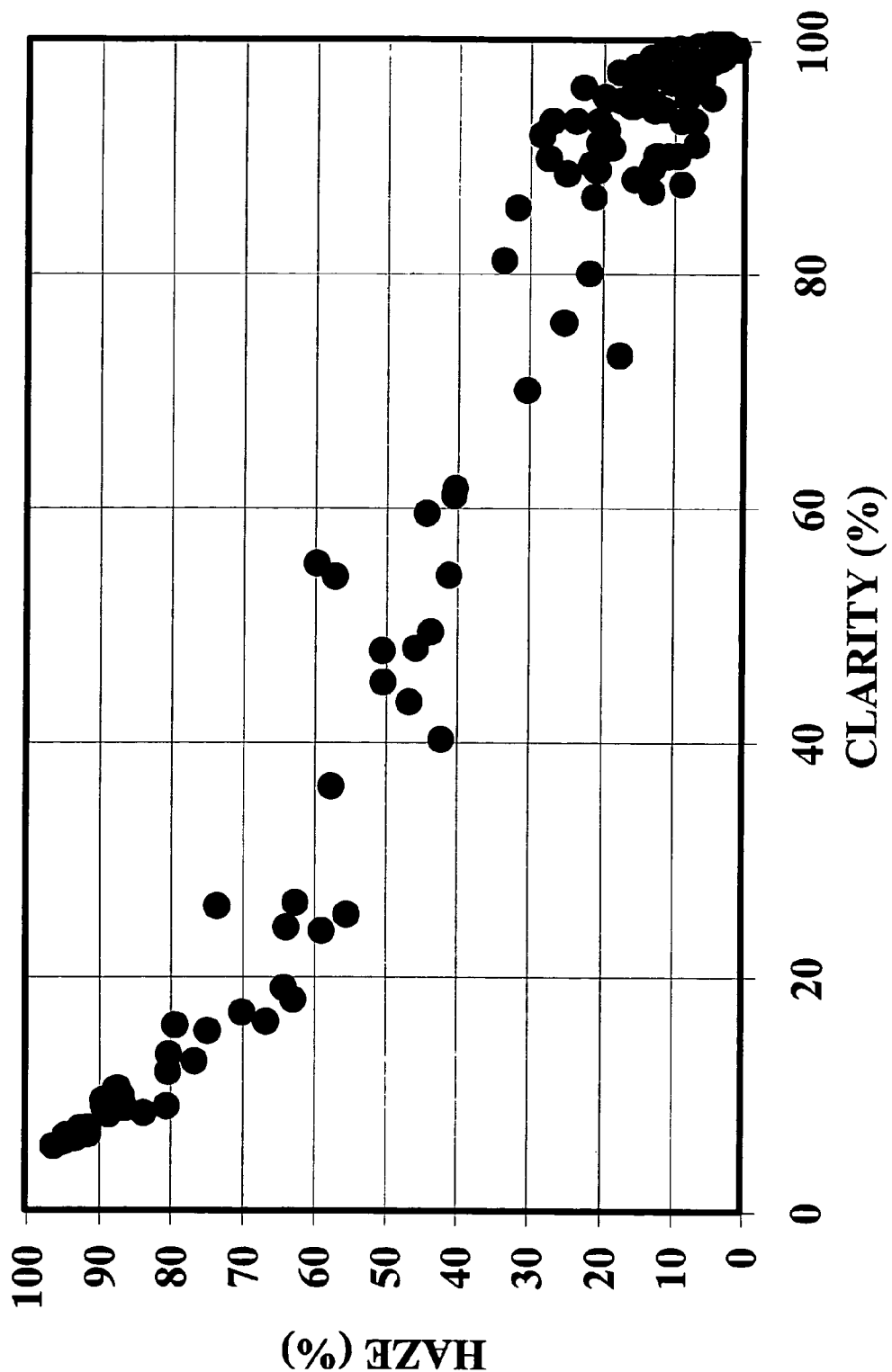
FIG. 2 illustrates a plot of haze versus clarity for both polyethylene homopolymer and copolymer films prepared according to the present invention, and for conventional polyethylene films.

Characterization data for the polymers and films prepared according to the present invention are provided in FIGS. 1–6. FIG. 1 presents a plot of haze versus density for polyethylene homopolymer and copolymer films prepared according to the present invention, emphasizing the differences in the inventive films and conventional polyethylene films. Thus, FIG. 1 illustrates that films prepared according to this invention are typically characterized by higher haze for their density, than conventional PE films. For comparison, FIG. 2 illustrates a plot of haze versus clarity for both polyethylene homopolymer and copolymer films prepared according to the present invention, and for conventional polyethylene films.

Figure 3:
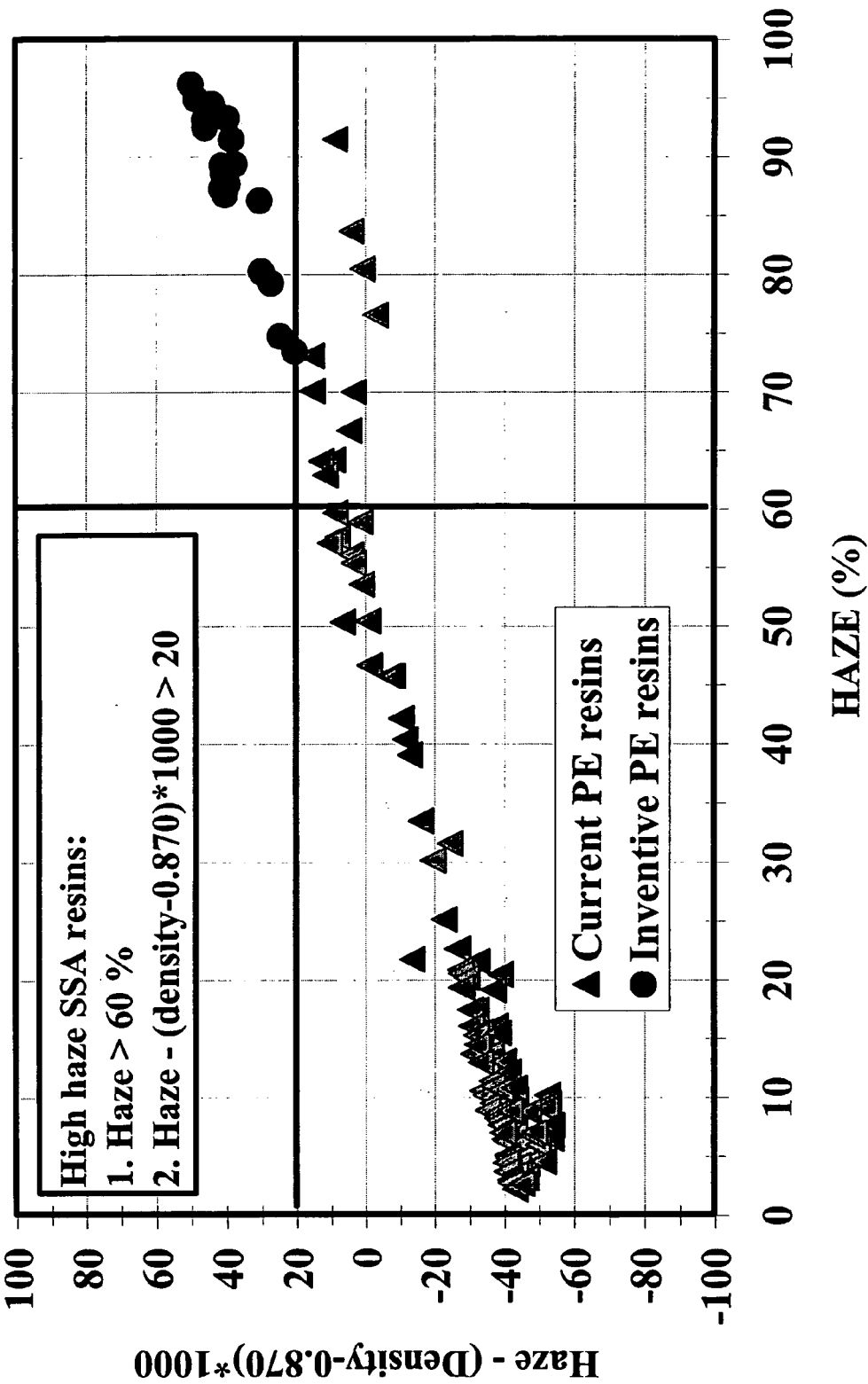
FIG. 3 presents a graph of haze−(density−0.870)×1000 versus haze (%) for blown polyethylene homopolymer and copolymer films prepared according to the present invention, indicating some of the unique properties of the inventive films as compared to conventional polyethylene films.

FIG. 3 presents a graph of haze−(density−0.870)×1000 versus haze (%) for blown polyethylene homopolymer and copolymer films prepared according to the present invention, illustrating some of the differences in properties of the inventive films as compared to conventional polyethylene films. In this aspect, films prepared according to this invention can be characterized by haze−(density−0.870)×1000 values of greater than or equal to about 20, with corresponding haze values of greater than or equal to about 70%. Conventional PE films have haze−(density−0.870)×1000 values less than about 20 when they are characterized by high haze values, as the data from FIG. 3 indicates.

Figure 4:
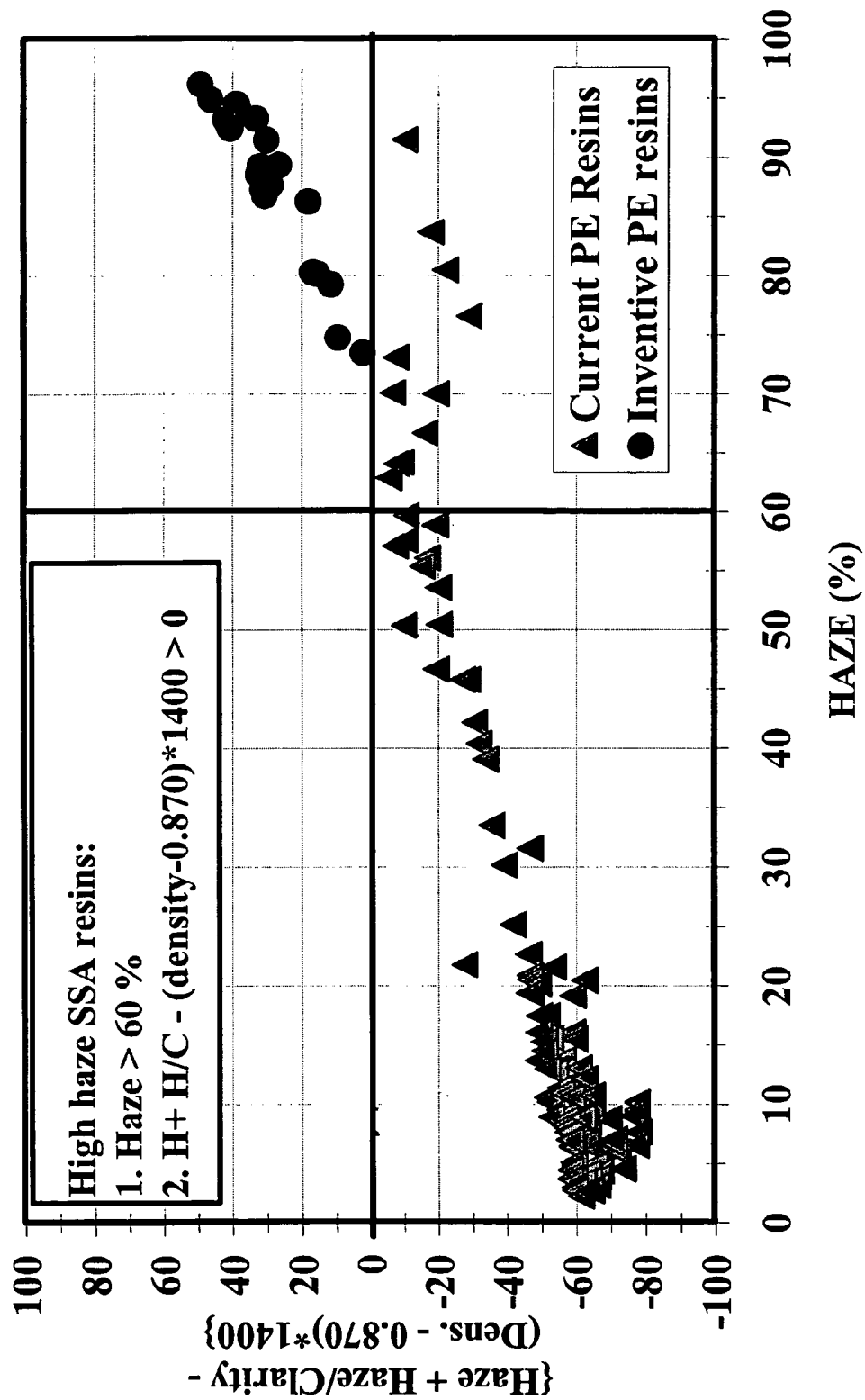
FIG. 4 presents a graph of haze+(haze÷clarity)−(density− 0.870)×1400 versus haze (%) for blown polyethylene homopolymer and copolymer films prepared according to the present invention, indicating some of the unique properties of the inventive films as compared to conventional polyethylene films.

FIG. 4 presents a graph of haze+(haze÷clarity)−(density−0.870)×1400 versus haze (%) for blown polyethylene homopolymer and copolymer films prepared according to the present invention, while FIG. 5 presents a plot of haze+(haze÷clarity)−(density−0.870)×1400 versus haze (%) for cast polyethylene homopolymer and copolymer films prepared according to the present invention, illustrating some of the differences in properties of the inventive films as compared to conventional polyethylene films. As disclosed in both graphs, conventional PE films have haze+(haze÷clarity)−(density−0.870)×1400 values less than 0 when they are characterized by high haze values, unlike the films disclosed herein. These Figures further illustrate that high haze results in blown and cast films.

FIG. 6 presents a graph of zero shear viscosity ($\eta_0$ at 190° C.) versus molecular weight ($M_w$) for polyethylene films prepared according to the present invention, illustrating some of the differences in properties of the inventive films as compared to conventional polyethylene films.

Thus, in another aspect, this invention provides a homopolymer or copolymer of ethylene and at least one α-olefin, wherein the homopolymer or copolymer forms a film characterized by a film haze (at 25 μm thickness), produced by film blowing under standard LLDPE conditions or by film casting, of greater than about 60%, and wherein the relationship, haze+(haze÷clarity)−(density−0.870)× 1400 has a value greater than or equal to about 0. In another aspect of this invention, the ethylene homopolymers and ethylene/α-olefin copolymers of this invention are characterized by a blown film clarity measured at a film thickness of about 25 μm of less than or equal to about 30%, and static and kinetic coefficient of friction of films at a thickness of about 25 μm made without the use of slip agents, fillers, inorganic pigments, opacifying agents, or antiblocking agents of less than about 0.55.

Thus, in another aspect, films prepared from the ethylene homopolymers and copolymers of this invention can exhibit film haze greater than or equal to about 70% measured at a film thickness of about 25 μm (1 mil), while having physical and rheological properties more closely associated with low haze films. For example, the 70% haze (1 mil) films of this invention are characterized by a film clarity of less than or equal to about 30% measured at a film thickness of about 25 μm (1 mil); a haze−(density−0.870)×1000 value greater than or equal to about 20 measured at a film thickness of about 25 μm (1 mil); haze+(haze÷clarity)−(density−0.870)×1400 value greater than or equal to about 0 measured at a film thickness of about 25 μm (1 mil); a substantially constant film haze, as measured over a range of film thickness, from about 0.5–1 mil.

In contrast, commercial polymers derived from other metallocene catalyst types typically provide extruded films of low haze and high clarity. Known examples of these typical metallocene polymer films include Chevron-Phillips D139 and D143, Exxon's Exceed™ and Dow's Elite™ 5100 and 5400. In one aspect of this invention, polymers prepared using at least one tightly-bridged-metallocene, at least one organoaluminum compound, and at least one acidic chemically-treated solid oxide, provides films of high haze and low clarity. This combination of properties renders these inventive LLDPE and ethylene/α-olefin copolymer resins and films useful in many applications where high haze is desired.

Definitions

In order to more clearly define the terms used herein, the following definitions are provided. To the extent that any definition or usage provided by any document incorporated herein by reference conflicts with the definition or usage provided herein, the definition or usage provided herein controls.

The term "polymer" is generally used herein to mean either homopolymers comprising the polymerization product of a single type of olefin, or copolymers comprising the polymerization product of two or more types of olefins. In one aspect, for example, the term "polymer of ethylene" can be used to refer to a homopolymer of ethylene, or refer to a copolymer of ethylene and another olefinic comonomer. In yet another aspect, the other olefinic comonomer is typically an α-olefin.

The terms "catalyst composition" and "catalyst" is used herein to describe the resulting mixture of the catalyst components: at least one tightly-bridged metallocene; at least one organoaluminum compound; and at least one chemically-treated solid oxide. In one aspect, the at least one chemically-treated solid oxide can be a fluorided metal oxide. These terms do not depend upon the actual product of the reaction of the catalyst components, any intermediates formed in the mixture, or in any intermediate mixture of less than all the catalyst components, the nature of the active catalytic site, or the fate of the bridged metallocene compound, the organoaluminum compound, or the chemically-treated solid oxide activator after combining these components. Therefore, the term catalyst composition includes both heterogeneous compositions and homogenous compositions.

The term "cocatalyst" is generally used herein to refer to the organoaluminum compounds that may constitute one component of the catalyst composition, but also refers to the optional components of the catalyst composition including, but not limited to, aluminoxanes, organoboron compounds, organozinc compounds, or ionizing ionic compounds, as disclosed herein. The term cocatalyst may be used regardless of the actual function of the compound or any chemical mechanism by which the compound may operate. In one aspect, the term cocatalyst is used to distinguish that component of the catalyst composition from the tightly-bridged metallocene compound. In another aspect, the typical cocatalysts include, but are not limited to, trialkyl aluminum compounds, dialkyl aluminum halide compounds, and alkyl aluminum dihalide compounds. The term cocatalyst may be used regardless of the actual function of the compound or any chemical mechanism by which the compound may operate.

The term "precontacted" mixture is used herein to describe a first mixture of catalyst components that are contacted for a first period of time prior to the first mixture being used to form a "postcontacted" or second mixture of catalyst components that are contacted for a second period of time. Typically, the precontacted mixture describes a mixture of metallocene compound (first, second, or both), olefin monomer, and organoaluminum compound, before this mixture is contacted with the chemically treated solid oxide and optionally additional organoaluminum compound. Thus, "precontacted" describes components that are used to contact each other, but prior to contacting the components in the second, postcontacted mixture. Accordingly, this invention may occasionally distinguish between a component used to prepare the precontacted mixture and that component after the mixture has been prepared. For example, according to this description, it is possible for the precontacted organoaluminum compound, once it is contacted with the metallocene and the olefin monomer, to have reacted to form at least one different chemical compound, formulation, or structure from the distinct organoaluminum compound used to prepare the precontacted mixture. In this case, the precontacted organoaluminum compound or component is described as comprising an organoaluminum compound that was used to prepare the precontacted mixture.

Similarly, the term "postcontacted" mixture is used herein to describe a second mixture of catalyst components that are contacted for a second period of time, and one constituent of which is the "precontacted" or first mixture of catalyst components that were contacted for a first period of time. Typically, the term "postcontacted" mixture is used herein to describe the mixture of first metallocene compound, first metallocene compound, olefin monomer, organoaluminum compound, and chemically treated solid oxide, formed from contacting the precontacted mixture of a portion of these components with any additional components added to make up the postcontacted mixture. Generally, the additional component added to make up the postcontacted mixture is the chemically treated solid oxide, and optionally may include an organoaluminum compound the same or different from the organoaluminum compound used to prepare the precontacted mixture, as described herein. Accordingly, this invention may also occasionally distinguish between a component used to prepare the postcontacted mixture and that component after the mixture has been prepared.

The terms "chemically treated solid oxide", solid oxide activator-support, acidic activator-support, activator-support, treated solid oxide compound, or simply activator, and the like are used herein to indicate a solid, inorganic oxide of relatively high porosity, which exhibits Lewis acidic or Brønsted acidic behavior, and which has been treated with an electron-withdrawing component, typically an anion, and which is calcined. The electron-withdrawing component is typically an electron-withdrawing anion source compound. Thus, the chemically treated solid oxide compound comprises the calcined contact product of at least one solid oxide compound with at least one electron-withdrawing anion source compound. Typically, the chemically treated solid oxide comprises at least one ionizing, acidic solid oxide compound. The terms support or activator-support are not used to imply these components are inert, and this component should not be construed as an inert component of the catalyst composition.

The term "inert atmosphere" is used herein to refer to any type of ambient atmosphere that is substantially unreactive toward the particular reaction, process, or material around which the atmosphere surrounds or blankets. Thus, this term is used to refer to the use of a substantially oxygen-free and moisture-free blanketing gas, including but not limited to dry argon, dry nitrogen, dry helium, or mixtures thereof, when any precursor, component, intermediate, or product of a reaction or process is sensitive to particular gases or moisture. Additionally, "inert atmosphere" is also used herein to refer to the use of dry hydrocarbon such as isobutane or hexane as a blanketing atmosphere.

The term metallocene describes a compound comprising two $\eta^5$-cycloalkadienyl-type ligands in the molecule. Thus, the metallocenes of this invention are bridged bis($\eta^5$-cyclopentadienyl-type ligand) compounds, wherein the $\eta^5$-cycloalkadienyl portions include cyclopentadienyl ligands, indenyl ligands, fluorenyl ligands, and the like, including partially saturated or substituted derivatives or analogs of any of these. Possible substituents on these ligands include hydrogen, therefore the description "substituted derivatives thereof" in this invention comprises partially saturated ligands such as tetrahydroindenyl, tetrahydrofluorenyl, octahydrofluorenyl, partially saturated indenyl, partially saturated fluorenyl, substituted partially saturated indenyl, substituted partially saturated fluorenyl, and the like. Further, the term "tightly-bridged" metallocene is used herein to describe a metallocene compound in which the two cyclopentadienyl-type ligands in a molecule are linked by a substituted or unsubstituted bridging moiety, wherein the shortest chain of the bridging moiety comprises one or two atoms. That is, the bridging moiety can comprise either one atom selected from carbon, silicon, germanium, or tin, bonded to both cyclopentadienyl-type ligands; or two contiguous carbon atoms in a chain, one end of which is bonded one cyclopentadienyl-type ligand and the other end of which is bonded to the other cyclopentadienyl-type ligand. In some contexts, the metallocene is referred to simply as the "catalyst", in much the same way the term "cocatalyst" is used herein to refer to the organoaluminum compound.

The term "hydrocarbyl" is used to specify a hydrocarbon radical group that includes, but is not limited to aryl, alkyl, cycloalkyl, alkenyl, cycloalkenyl, cycloalkadienyl, alkynyl, aralkyl, aralkenyl, aralkynyl, and the like, and includes all substituted, unsubstituted, branched, linear, heteroatom substituted derivatives thereof.

All publications and patents mentioned herein are incorporated herein by reference for the purpose of describing and disclosing, for example, the constructs and methodologies that are described in the publications, which might be used in connection with the presently described invention. The publications discussed above and throughout the text are provided solely for their disclosure prior to the filing date of the present application. Nothing herein is to be construed as an admission that the inventors are not entitled to antedate such disclosure by virtue of prior invention.

For any particular compound disclosed herein, any general structure presented also encompasses all conformational isomers, regioisomers, and stereoisomers that may arise from a particular set of substitutents. The general structure also encompasses all enantiomers, diastereomers, and other optical isomers whether in enantiomeric or racemic forms, as well as mixtures of stereoisomers, as the context requires.

The present invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to one of ordinary skill in the art without departing from the spirit of the present invention or the scope of the appended claims.

In the following examples, unless otherwise specified, the syntheses and preparations described therein were typically carried out under an inert atmosphere such as nitrogen and/or argon. Solvents were purchased from commercial sources and were typically dried over activated alumina prior to use. Unless otherwise specified, reagents were obtained from commercial sources.

Unless specified otherwise, or unless the context requires otherwise, certain abbreviations that are used herein, include, but not limited to: Ind, indenyl; Flu, fluorenyl; Cp, cyclopentadienyl; C2, ethylene; C6, 1-hexene; iC4, isobutane; FSA, fluorided silica-alumina; CTSO, chemically-treated solid oxide.

EXAMPLE 1

General Reaction and Characterization Details

Melt Rheological Characterization

Small-strain (10%) oscillatory shear measurements were performed on a Rheometrics Scientific, Inc. ARES rheometer using parallel-plate geometry. All rheological tests were performed at 190° C. in an inert (nitrogen) atmosphere to prevent polymer degradation. The complex viscosity $|\eta^*|$ versus frequency ($\omega$) data were then curve fitted using the modified three parameter Carreau-Yasuda (CY) empirical model to obtain the zero shear viscosity, $\eta_0$; characteristic viscous relaxation time, $\tau_\eta$; and the breadth parameter, $\alpha$.

The simplified Carreau-Yasuda (CY) empirical model is as follows.

$$|\eta^*(\omega)| = \frac{\eta_0}{[1 + (\tau_\eta \omega)^a]^{(1-n)/a}},$$

wherein:
$|\eta^*(\omega)|$=magnitude of complex shear viscosity;
$\eta_0$=zero shear viscosity
$\tau_\eta$=viscous relaxation time
$\alpha$="breadth" parameter
n=fixes the final power law slope, fixed at 2/11; and
$\omega$=angular frequency of oscillatory shearing deformation.

Details of the significance and interpretation of the CY model and derived parameters may be found in: C. A. Hieber and H. H. Chiang, *Rheol. Acta,* 28, 321 (1989); C. A. Hieber and H. H. Chiang, *Polym. Eng. Sci.,* 32, 931 (1992); and R. B. Bird, R. C. Armstrong and O. Hasseger, *Dynamics of Polymeric Liquids, Volume 1, Fluid Mechanics,* 2nd Edition, John Wiley & Sons (1987); each of which is incorporated herein by reference in its entirety.

To elucidate the rheological differences among the resins in a more quantitative manner, an estimation of the recoverable shear strain parameter was undertaken. Formally, the recoverable shear strain, $\gamma_\infty$, for a rubberlike (Lodge) liquid can be stated to be equal to $$\gamma_\infty = \frac{N_1}{2\tau} \qquad \text{Eqn. (1)}$$

where $N_1$ is the first normal stress difference and $\tau$ is the shear stress (J. M. Dealy, K. F. Wissbrun, "Melt Rheology and its Role in Plastics Processing: Theory and Applications", Van Nostrand Reinhold, New York, (1990).) At low frequencies, the recoverable shear can be estimated to be equal to $$\gamma_\infty \sim \frac{G'}{\omega |\eta^*|} \qquad \text{Eqn. (2)}$$

where G' represents the elastic part of the dynamic shear modulus while $|\eta^*|$ and $\omega$ represent the magnitudes of the corresponding complex viscosity (using the well known Cox-Merz rule) and frequency, respectively. Applying this approximation in the low frequency range ($\omega$=0.03 s$^{-1}$) the values for recoverable shear strain parameter were obtained for each resin. The choice of the low frequency at which $\gamma_\infty$ was estimated rests in the fact that differences in the elastic character of various melts are magnified at low frequencies (or shear rates) since they probe the longest relaxation time behavior at these conditions (M. Shida, R. N. Shroff, and L. V. Cancio, *Polym. Eng. Sci.,* 17, 769 (1977)). Furthermore, the approximation in equation (1) above is valid at very low frequencies or shear rates.

Melt Index

Melt Index (MI) was measured in accordance with ASTM D-1238, condition F (190° C., 2.16 kg). Density was measured using density gradient columns in accordance with ASTM D-1505.

Molecular Weight Measurements By Gel Permeation Chromatography (GPC)

Molecular weight distribution (MWD), molecular weight averages ($M_n$, $M_w$, $M_z$) and polydispersity ($M_w/M_n$) were obtained using a Waters 150 CV Plus Gel Permeation Chromatograph using trichlorobenzene as the solvent.

Blown Film Processing

All the blown film samples were made on a laboratory-scale blown film line using typical linear low-density (LL-DPE) conditions as follows: 100 mm (4 inch) die diameter, 1.5 mm (0.060 inch) die gap, 37.5 mm (1.5 inch) diameter single-screw extruder fitted with a barrier screw with a Maddock mixing section at the end (L/D=24, 2.2:1 compression ratio), 115 RPM screw speed [about 27 kg/h (60 lb/h) output rate], 2.5:1 blow up ratio (BUR), "in-pocket" bubble with a "freeze line height" (FLH) between 20–28 cm (8–11 inch), 190° C. (375° F.) barrel and die set temperatures and 1 mil (25 micron) thick film. Cooling was accomplished with a Dual Lip air ring using ambient (laboratory) air at about 25° C. (75–80° F.). These particular processing conditions were chosen since the film properties so obtained are representative of those obtained from larger, commercial scale film blowing conditions.

Haze and Clarity Measurements

The haze (%) was measured in accordance with the procedures specified in ASTM D 1003-97. The clarity (%), also referred to as transparency, was measured in accordance with the procedures specified in ASTM D 1746-97. Both measurements were made on a Haze Gard Plus™ instrument (Model 4725) manufactured by the BYK-Gardner® Company.

Melt Strength Measurements

The melt strength measurements at 5.0 mil and 1 mil used to characterize the polymer resins of this invention were carried out using a melt strength test developed at Chevron-Phillips Chemical Company, according to the following procedure.

The melt strength measurements were performed by extruding a polymer melt using a 1.25-inch single-screw extruder (Killion KL-125), fitted with a barrier screw having a single Maddock mixing section at the end. The extruder temperature profile was a flat 190° C. The screw speed was adjusted as required to maintain a constant output rate of about 70 g/min. An 8-inch wide cast film die with a 0.020-inch die gap was fitted at the end of the extruder, such that the melt emerging from the die came out vertically downward. A pair of air-knives about 10 inches long each was positioned using a stationery stand 1 inch vertically downward from the die exit. The air-knives were separated horizontally by a gap of 4 inches. The air-knives were adjusted such that that the polymer melt emerging from the die passed through the center of this gap, leaving roughly 2 inches between the film surface and air-knife on either side. Standard laboratory line air (supplied at about 60 psi pressure) was passed through the air-knife assembly using an equi-length splitter assembly to ensure the same air-flow velocity through each air-knife. The air-knives were set at full open and were used to cool the polymer melt as it emerged from the die.

Once the melt passed through the air-knife assembly, it was passed through a primary roller and then to secondary rollers which were connected to a take-up device. The speed of this take-up device was adjusted so as to obtain an average film thickness of 5 mil or 1 mil as desired. The melt strength reported herein is simply the total width of the resultant film at either 5 mil or 1 mil, measured in inches.

Static and Kinetic Coefficients of Friction (COF)

The static and kinetic coefficients of friction were measured in accordance with procedures specified in ASTM D 1894-01.

Preparation of a Fluorided Alumina Chemically-treated Solid Oxide

The silica-alumina used to prepare the fluorided alumina chemically-treated solid oxide was obtained from W.R. Grace as Grade MS13-110, and contained 13% alumina, had a pore volume of about 1.2 cc/g, and a surface area of about 400 m²/g. This material was fluorided by impregnation to incipient wetness with a solution containing ammonium bifluoride in an amount sufficient to equal 10 wt % of the weight of the silica-alumina. This impregnated material was then dried in a vacuum oven for 8 hours at 100° C. The fluorided silica-alumina samples obtained in this fashion were then calcined as follows. About 10 grams of the fluorided silica-alumina were placed in a 1.75 inch quartz tube fitted with a sintered quartz disk at the bottom. While the fluorided silica-alumina was supported on the disk, dry air was blown up through the disk at the linear rate of about 1.6 to 1.8 standard cubic feet per hour. An electric furnace around the quartz tube was used to increase the temperature of the tube at the rate of about 400° C. per hour to a final temperature of about 450° C. At this temperature, the silica-alumina was allowed to fluidize for three hours in the dry air. Afterward, the silica-alumina was collected and stored under dry nitrogen, and was used without exposure to the atmosphere.

EXAMPLE 2

Preparation of the Catalyst Composition and Polymerization of Ethylene and 1-Hexene Ethylene copolymers were prepared in a continuous particle form process (also known as a slurry process) by contacting the catalyst of the present invention with ethylene and 1-hexene comonomer. The polymerization medium and polymerization temperature are thus selected such that the copolymer is produced in the form of solid particles and is recovered in that form. General polymerization reaction details are as follows.

Ethylene was dried over activated alumina and used as the monomer. Isobutane that had been degassed by fractionation and dried over activated alumina was used as the diluent.

The polymerization reactor was a liquid-full 15.2 cm diameter pipe loop having a volume of 23 gallons (87 liters). The fluorided silica-alumina, the trialkylaluminum (typically triethylaluminum), and the metallocene were all fed to the reactor through a precontacting vessel, where the three ingredients contacted each other at room temperature for about 10 minutes, before entering the reaction zone. Relative amounts of metallocene, trialkylaluminum, and chemically-treated solid oxide are provided in Table 1 for resins A through F. Liquid isobutane was used as the diluent, and occasionally some hydrogen was added to regulate the molecular weight of the polymer product. The reactor pressure was about 4 Mpa (about 580 psi). The reactor temperature was varied over a range, from about 65° C. to about 110° C., as indicated. The polymerization reactor was operated to have a residence time of 1.25 hours. Catalyst was added through a 0.35 cc circulating ball-check feeder. At steady-state conditions the isobutane feed rate was about 46 liters per hour, the ethylene feed rate was about 30 lbs/hr, and the 1-hexene feed rate was varied to control the density of the polymer product. Ethylene concentration in the diluent was from about 14 to about 20 mole percent. Catalyst concentrations in the reactor are such that the catalyst system content typically ranges from 0.001 to about 1 weight percent based on the weight of the reactor contents. Polymer was removed from the reactor at the rate of about 25 lbs per hour and recovered in a flash chamber. A Vulcan dryer was used to dry the polymer under nitrogen from about 60° C. to about 80° C.

Triethylaluminum (TEA) cocatalyst was fed to the reactor to maintain a concentration of about 20 ppm. Metallocene solutions continuously were fed to the reactor to maintain a concentration in the reactor from about 0.2 to about 1 ppm based on the weight of the isobutane diluent. To prevent static buildup in the reactor, a small amount (<5 ppm relative to diluent) of a commercial antistatic agent sold as Stadis 450 was usually added.

EXAMPLE 3

Preparation of Polymers Characterized in Tables 2–6

Each of the resins A through F which are described in Tables 1–6 herein, were prepared according to the procedure detailed above, using the selections for catalyst, cocatalyst, cocatalyst:catalyst ratios, temperature, monomer mole percents, 1-hexene feed rate, and the like, as indicated in Table 1, which afforded resins and films with the melt index, density, and other properties as indicated in Tables 2–6. In some cases the three components of the catalyst were combined in the presence of a small amount of the olefin listed under "Pretreatment" in the table.

TABLE 1

Summary of Polymer Resin Synthesis Conditions.

| | | Pretreatment | | | | | | 1-Hexene |
|---|---|---|---|---|---|---|---|---|
| Resin | Bridged Metallocene[A] | AlR$_3$ (Al: Zr mol:mol)[B] | Olefin | Cocatalyst (ppm) | Reaction Temp (° F.) | Ethylene (mol %) | H$_2$ (FRC) | feed rate (lb/h) |
| A | Zr(a) | TEA (200) | Norbornene | 21.39 | 177.1 | 14.34 | 5 | 5.94 |
| B | Zr(a) | TEA (200) | Norbornene | 21.12 | 177.1 | 14.05 | 4.75 | 6.07 |
| C | Zr(a) | TMA (5) | — | 11.35 | 196.2 | 13.97 | — | 3.51 |
| D | Zr(b) | TEA (10) | 1-hexene | 13.41 | 180.2 | 13.19 | — | 6.34 |
| E | Zr(a) | TEA (50) | — | 14.68 | 179.6 | 13.76 | — | 5.47 |
| F | Zr(b) | TEA (50) | 1-hexene | 9.32 | 179.1 | 13.87 | 19.75 | 4.62 |

[A]Zr(a) = rac-ethylenebis(indenyl)zirconium dichloride (rac-C$_2$H$_4$(Ind)$_2$ZrCl$_2$), and Zr(b) = dimethylsilyl bis(indenyl)zirconium dichloride (SiMe$_2$(Ind)$_2$ZrCl$_2$).
[B]TEA = triethylaluminum; TMA = trimethylaluminum.

EXAMPLE 4

Characterization of Polymers and Comparisons with Commercially Available Resins Examples of the properties of the LLDPE films of the present invention are demonstrated in Table 2, where their properties are compared with films prepared from other commercially available resins. In Tables 2–6, Resins A, B, C, D, E, and F are polymer resins prepared according to the present invention as indicated in Table 1. In one aspect, for example, a comparison of the melt index (MI), density, and coefficient of friction (COF) of the commercially available D143SA resin as compared to resin A of this invention reveals little difference in the physical and rheological properties between the two. However, the measured haze and clarity are significantly different than those one of ordinary skill would expect, on the basis of the substantially similar physical and rheological properties of these resins. The ASTM standards for these measurements are specified in the Example 1.

TABLE 2

Comparison of Polymer Properties Among Commerically-Available Resins and Resins of the Present Invention.

| LLDPE RESIN | MI (dg/min) | DENSITY (g/cm³) | HAZE (%) | CLARITY (%) | COF (static/kinetic) |
|---|---|---|---|---|---|
| D139 | 1 | 0.918 | 2.7 | 99.7 | 1.0/0.7 |
| D143 | 1.2 | 0.916 | 5.9 | 98.6 | 0.96/0.64 |
| D143SA* | 1.2 | 0.922 | 14.7 | — | 0.39/0.37 |
| D257 | 0.2 | 0.923 | 52.7 | 35.3 | 0.43/0.40 |
| Resin A | 1 | 0.918 | 87.6 | 10.3 | 0.44/0.37 |
| Resin B | 1.2 | 0.916 | 87.2 | 10.4 | 0.52/0.44 |
| Resin C | 2.3 | 0.928 | 86.2 | 8.7 | 0.44/0.35 |

*With Slip and Antiblock added to reduce COF.

EXAMPLE 5

Characterization of Polymers' Haze and Clarity as a Function of Film Gauge

In addition, the unique film gauge independence of the optical properties of LLDPE films of the present invention are demonstrated in Table 3, where properties of films prepared from other commercially available resins are compared. Typically, as film gauge decreases, haze decreases and clarity and optical opacity increase, as seen in the D257 resin data. However, the haze and optical opacity of the films of the present invention remain substantially constant as film gauge decreases.

TABLE 3

Haze and Clarity Measurements as a Function of Film Gauge.

| RESIN | MI (dg/min) | DENSITY (g/cm³) | FILM GAUGE (mils) | HAZE (%) | CLARITY (%) |
|---|---|---|---|---|---|
| D257 | 0.2 | 0.923 | 1 | 55.3 | 35.5 |
| D257 | 0.2 | 0.923 | 0.5 | 39.6 | 51.2 |
| Resin D | 0.13 | 0.917 | 1 | 83.1 | 10.7 |
| Resin D | 0.13 | 0.917 | 0.5 | 83.2 | 11.4 |
| Resin E | 0.3 | 0.917 | 1 | 90.9 | 7.3 |
| Resin E | 0.3 | 0.917 | 0.5 | 90.9 | 7.0 |

EXAMPLE 6

Characterization of Polymers According to Melt Index, Density, Molecular Weight and Zero Shear Viscosity Table 4 provides examples of comparison of the melt index (MI), density, molecular weight ($M_W$), molecular weight distribution ($M_W/M_N$), and zero shear viscosity of selected commercially available resins as compared to the resins of this invention, in which little difference in the physical properties is observed between the two. However, the differences in haze, clarity, and melt strength among the films of these same resins are significantly different, as indicated in Table 5.

TABLE 4

Comparison of Properties of Resins Used to Prepare Blown Films.

| RESIN | MI (dg/min) | Density (g/cm³) | $M_W$ (kg/mol) | $M_W/M_N$ | $\eta_0$(Pa·s)* |
|---|---|---|---|---|---|
| D139 | 1.0 | 0.918 | 105.13 | 2.38 | 8.81E3 |
| D143 | 1.2 | 0.916 | 95.32 | 2.27 | 6.51E3 |
| Dynex D605A | 0.5 | 0.917 | 159.81 | 4.79 | 2.25E4 |
| Dow 2045 | 1.0 | 0.920 | 117.69 | 3.96 | 1.04E4 |
| Resin A | 1.0 | 0.918 | 117.14 | 5.55 | 1.59E5 |
| Resin B | 1.1 | 0.916 | 121.10 | 5.52 | 1.79E5 |
| Resin C | 2.3 | 0.928 | 83.19 | 4.00 | 7.96E3 |
| Resin F | 0.6 | 0.917 | 145.92 | 9.68 | 1.29E7 |

*Standard exponential abbreviations, for example, 1E+03 = 1E3 = 1 × 10³

EXAMPLE 7

Characterization of Polymers According to Haze, Clarity, Melt Strength, and Coefficient of Friction The differences in haze, clarity, and melt strength among the films prepared according to the present invention of the same resins as characterized in Example 6 can exhibit significant differences, as indicated in Table 5.

TABLE 5

Comparison of 25 μm (1 mil) Blown Film Characteristics.

| RESIN | MELT STRENGTH @ 5 mil/1 mil* (inch) | HAZE (%) | CLARITY (%) | COF (STATIC/KINETIC) |
|---|---|---|---|---|
| D139 | 5.04/3.61 | 2.7 | 99.7 | 1.00/0.71 |
| D143 | 5.00/2.75 | 5.9 | 98.6 | 0.96/0.64 |
| Dynex D605A | 5.50/4.50 | 6.8 | 99.1 | —/1.95 |
| Dow 2045 | 5.63/4.63 | 10.6 | 95.5 | — |
| Resin A | —/— | 87.6 | 10.3 | 0.44/0.37 |
| Resin B | 6.06/5.25 | 87.2 | 10.4 | 0.52/0.44 |
| Resin C | 6.13/5.38 | 86.2 | 8.7 | 0.40/0.35 |
| Resin F | 6.13/5.00 | 92.4 | 7.0 | 0.53/0.44 |

*Measured according to Example 6, using test developed in-house.

In comparing the properties of the films formed from olefin/α-olefin copolymer resins, these results indicate that, despite the similarities in polymer characteristics shown in Table 4, the inventive polymers exhibit enhanced melt strength, enhanced haze, and lower clarity, making them more suitable for non-clarity film packaging applications. Further, the lower coefficient of friction (COF) values of the inventive polymers indicate improved antiblocking characteristics of these films as compared to standard LLDPE (formed from Ziegler-Natta catalysts) or mLLDPE (formed from metallocene based catalysts) films.

Thus, as demonstrated in these tables, although some differences are noted between the physical and chemical properties of conventional LLDPE olefin/α-olefin copolymer resins, as compared to the resins of the present invention, one of ordinary skill would not expect these minor differences to result in the major differences observed in haze and clarity.

EXAMPLE 8

Resin and Film Properties for Polymers

Many of the resin properties and film properties for polymers prepared according to this invention are presented in Table 6, including some of the calculated parameters used in the Figures.

TABLE 6

Resin and Film Properties for Polymers Prepared According to this Invention.

| PARAMETER[A] | RESIN | | | | | |
| --- | --- | --- | --- | --- | --- | --- |
| | A | B | C | D | E | F |
| ρ (density, g/cm³) | 0.918 | 0.916 | 0.926 | 0.917 | 0.917 | 0.917 |
| $M_w/M_n$ | 5.55 | 5.52 | 4.00 | 6.81 | 9.71 | 9.68 |
| HLMI (dg/min) | 55.7 | 56.8 | 81.2 | 12.36 | 23.0 | 35.1 |
| MI (dg/min) | 1.01 | 1.15 | 2.22− | 0.14 | 0.3 | 0.58 |
| HLMI/MI | 55 | 49 | 37− | 88 | 77 | 61 |
| H (Haze, %, 1 mil) | 87.6 | 87.2 | 86.2 | 83.1 | 93.1 | 92.4 |
| C (Clarity, %, 1 mil) | 10.3 | 10.4 | 8.7 | 10.7 | 6.6 | 7.0 |
| H/C | 8.50 | 8.38 | 9.87 | 7.77 | 14.17 | 13.14 |
| H + H/C | 96.1 | 95.6 | 96.1 | 90.9 | 107.3 | 105.5 |
| H − (ρ − 0.870) × 1000 | 39 | 41 | 30 | 40 | 46 | 46 |
| H + (H/C) − (ρ − 0.870) × 1400 | 28.5 | 30.9 | 17.7 | 30.3 | 41.2 | 41.6 |
| $\eta_0 = \eta_{0,}obs$ (Pa · s) | 1.59E+05 | 1.79E+05 | 7.96E+03 | 1.48E+13 | 9.77E+04 | 1.29E+07 |
| $\eta_{0,}lin$ | 1.12E+04 | 1.25E+04 | 3.47E+03 | 5.75E+04 | 8.31E+03 | 2.36E+04 |
| $|(\eta_{0,}lin - \eta_{0,}obs)/ \eta_{0,}lin| \times 100$ | 1,323 | 1,335 | 129 | 25,646,566,889 | 1,076 | 54,500 |

[A]Standard exponential abbreviations, for example, 1E+03 = 1E3 = 1 × 10³

We claim:

1. A homopolymer or copolymer of ethylene having a polydispersity index (Mw/Mn) less than or equal to about 20, a film clarity of a 1 mil film less than or equal to about 30%, and a film haze of a 1 mil film greater than or equal to 70%.

2. The homopolymer or copolymer of claim 1, wherein the polydispersity index is less than or equal to about 12, the film clarity is less than or equal to about 20%, and the film haze is greater than or equal to about 80%.

3. The homopolymer or copolymer of claim 1, wherein the polydispersity index is less than or equal to about 10, the film clarity is less than or equal to about 10%, and the film haze is greater than or equal to about 90%.

4. The homopolymer or copolymer of claim 1, further characterized by a density less than about 0.935 g/cm³.

5. The homopolymer or copolymer of claim 1, further characterized by a melt index (MI) from about 0.01 to about 10 dg/min.

6. The homopolymer or copolymer of claim 1, further characterized by a high load melt index (HLMI) from about 8 to about 180 dg/min.

7. The homopolymer or copolymer of claim 1, further characterized by a melt strength of a 1 mil film greater than or equal to about 5.0 in.

8. The homopolymer or copolymer of claim 1, further characterized by a film coefficient of friction less than about 0.55.

9. A film comprising the homopolymer or copolymer of claim 1.

10. A molded product comprising the homopolymer or copolymer of claim 1.

11. The molded product of claim 10, wherein the molded product is a film, a sheet, a fiber, an extrusion molded product, an injection molded product, an expansion molded product, or a blow molded product.

12. The molded product of claim 10, wherein the molded product is a multilayer product comprising more than one layer of the homopolymer or copolymer.

13. A homopolymer or copolymer of ethylene having a melt index (MI) from about 0.01 to about 10 dg/min, a film clarity of a 1 mil film less than or equal to about 30%, and a film haze of a 1 mil film greater than or equal to 70%.

14. The homopolymer or copolymer of claim 13, wherein the melt index is from about 0.03 to about 7 dg/min, the film clarity is less than or equal to about 20%, and the film haze is greater than or equal to about 80%.

15. The homopolymer or copolymer of claim 13, wherein the melt index is from about 0.05 to about 5 dg/min, the film clarity is less than or equal to about 10%, and the film haze is greater than or equal to about 90%.

16. The homopolymer or copolymer of claim 13, further characterized by a density less than about 0.935 g/cm³.

17. The homopolymer or copolymer of claim 13, further characterized by a melt strength of a 1 mil film greater than or equal to about 5.0 in.

18. A film comprising the homopolymer or copolymer of claim 13.

19. A molded product comprising the homopolymer or copolymer of claim 13.

20. The molded product of claim 19, wherein the molded product is a film, a sheet, a fiber, an extrusion molded product, an injection molded product, an expansion molded product, or a blow molded product.

21. The molded product of claim 19, wherein the molded product is a multilayer product comprising more than one layer of the homopolymer or copolymer.

22. A homopolymer or copolymer of ethylene having a high load melt index (HLMI) from about 8 to about 180 dg/min, a film clarity of a 1 mil film less than or equal to about 30%, and a film haze of a 1 mil film greater than or equal to 70%.

23. The homopolymer or copolymer of claim 22, wherein the high load melt index (HLMI) is from about 10 to about 150 dg/min, the film clarity is less than or equal to about 20%, and the film haze is greater than or equal to about 80%.

24. The homopolymer or copolymer of claim 22, wherein the high load melt index (HLMI) is from about 11 to about 100 dg/min, the film clarity is less than or equal to about 10%, and the film haze is greater than or equal to about 90%.

25. The homopolymer or copolymer of claim 22, further characterized by a density less than about 0.935 g/cm$^3$.

26. The homopolymer or copolymer of claim 22, further characterized by a melt strength of a 1 mil film greater than or equal to about 5.0 in.

27. A film comprising the homopolymer or copolymer of claim 22.

28. A molded product comprising the homopolymer or copolymer of claim 22.

29. The molded product of claim 28, wherein the molded product is a film, a sheet, a fiber, an extrusion molded product, an injection molded product, an expansion molded product, or a blow molded product.

30. The molded product of claim 28, wherein the molded product is a multilayer product comprising more than one layer of the homopolymer or copolymer.

31. A homopolymer or copolymer of ethylene having a film clarity of a 1 mil film less than or equal to about 30%, a film haze of a 1 mil film greater than or equal to 70%, and a density less than about 0.935 g/cm$^3$.

32. The homopolymer or copolymer of claim 31, wherein the film haze of a 1 mil film is at least about 80%.

33. The homopolymer or copolymer of claim 31, wherein the film haze of a 1 mil film is at least about 90%.

34. The homopolymer or copolymer of claim 31, further characterized by a polydispersity index (Mw/Mn) less than or equal to about 12.

35. The homopolymer or copolymer of claim 31, wherein the density is less than about 0.926 g/cm$^3$.

36. The homopolymer or copolymer of claim 31, further characterized by a melt index (MI) from about 0.03 to about 7 dg/min.

37. The homopolymer or copolymer of claim 31, further characterized by a melt strength of a 1 mil film greater than or equal to about 5.0 in.

38. The homopolymer or copolymer of claim 31, further characterized by a substantially constant film haze measured at a film thickness from about 0.5 mil to about 1 mil.

39. A film comprising the homopolymer or copolymer of claim 31.

40. A molded product comprising the homopolymer or copolymer of claim 31.

41. The molded product of claim 40, wherein the molded product is a film, a sheet, a fiber, an extrusion molded product, an injection molded product, an expansion molded product, or a blow molded product.

42. The molde product of claim 40, wherein the molded product is a multilayer product comprising more than one layer of the homopolymer or copolymer.

\* \* \* \* \*